United States Patent
Thatte

(10) Patent No.: US 12,012,974 B2
(45) Date of Patent: Jun. 18, 2024

(54) POWER GENERATION SYSTEM WITH ROTARY LIQUID PISTON COMPRESSOR FOR TRANSCRITICAL AND SUPERCRITICAL COMPRESSION OF FLUIDS

(71) Applicant: Energy Recovery, Inc., San Leandro, CA (US)

(72) Inventor: Azam Thatte, Kensington, CA (US)

(73) Assignee: Energy Recovery, Inc., San Leandro, CA (US)

( * ) Notice: Subject to any disclaimer, the term of this patent is extended or adjusted under 35 U.S.C. 154(b) by 500 days.

(21) Appl. No.: 17/380,818

(22) Filed: Jul. 20, 2021

(65) Prior Publication Data

US 2021/0348627 A1 Nov. 11, 2021

Related U.S. Application Data

(62) Division of application No. 16/452,236, filed on Jun. 25, 2019, now Pat. No. 11,073,169.

(Continued)

(51) Int. Cl.
*F04F 13/00* (2009.01)
*F01D 15/10* (2006.01)
(Continued)

(52) U.S. Cl.
CPC ............. *F04F 13/00* (2013.01); *F01D 15/10* (2013.01); *F01K 3/006* (2013.01); *F01K 7/16* (2013.01);
(Continued)

(58) Field of Classification Search
CPC .. F04F 13/00; F01K 3/006; F01K 7/16; F01K 7/32; F01K 21/045; F01K 25/103;
(Continued)

(56) References Cited

U.S. PATENT DOCUMENTS

| 4,887,942 A | 12/1989 | Hauge |
| 5,336,059 A | 8/1994 | Rowley |

(Continued)

FOREIGN PATENT DOCUMENTS

| WO | 2011092705 A8 | 8/2011 |
| WO | 2017125251 A1 | 7/2017 |

OTHER PUBLICATIONS

International Preliminary Report on Patentability for International Application No. PCT/US2019/039334, dated Jan. 7, 2021, 11 Pages.

(Continued)

*Primary Examiner* — Dominick L Plakkoottam
(74) *Attorney, Agent, or Firm* — LOWENSTEIN SANDLER LLP

(57) ABSTRACT

A system includes a rotary liquid piston compressor configured to exchange pressure between a liquid and a supercritical fluid. The rotary liquid piston compressor includes a rotor configured to exchange pressure between the liquid and the supercritical fluid as the rotor rotates. The rotor defines channels that extend through the rotor. The rotary liquid piston compressor further includes barriers configured to block mixing between the liquid and the supercritical fluid. The barriers rest within the rotor. Each channel of the channels is configured to receive a barrier of the barriers.

20 Claims, 17 Drawing Sheets

Related U.S. Application Data

(60) Provisional application No. 62/690,177, filed on Jun. 26, 2018.

(51) Int. Cl.

| | |
|---|---|
| *F01K 3/00* | (2006.01) |
| *F01K 7/16* | (2006.01) |
| *F01K 7/32* | (2006.01) |
| *F01K 21/04* | (2006.01) |
| *F01K 25/10* | (2006.01) |
| *F02C 1/10* | (2006.01) |
| *F15B 3/00* | (2006.01) |

(52) U.S. Cl.
CPC .............. *F01K 7/32* (2013.01); *F01K 21/045* (2013.01); *F01K 25/103* (2013.01); *F02C 1/105* (2013.01); *F15B 3/00* (2013.01)

(58) Field of Classification Search
CPC .. F01K 25/08; F02C 1/105; F02C 1/10; F02C 1/05; F02C 3/04; F02C 1/04; F02C 3/08; F01D 15/10; F02G 1/04; F15B 3/00
See application file for complete search history.

(56) References Cited

U.S. PATENT DOCUMENTS

| | | | | |
|---|---|---|---|---|
| 6,540,487 | B2* | 4/2003 | Polizos | F15B 21/008 |
| | | | | 417/103 |
| 8,397,506 | B1* | 3/2013 | Wright | F02C 1/10 |
| | | | | 415/110 |
| 8,596,075 | B2* | 12/2013 | Allam | F02C 3/20 |
| | | | | 60/39.5 |
| 9,388,817 | B1 | 7/2016 | Wright et al. | |
| 9,695,795 | B2 | 7/2017 | Martin et al. | |
| 9,920,774 | B2 | 3/2018 | Ghasripoor et al. | |
| 10,119,379 | B2 | 11/2018 | Richter et al. | |
| 10,167,710 | B2 | 1/2019 | Ghasripoor et al. | |
| 10,557,482 | B2 | 2/2020 | Anderson | |
| 11,073,169 | B2 | 7/2021 | Thatte | |
| 2004/0250556 | A1 | 12/2004 | Sienel | |
| 2010/0024421 | A1* | 2/2010 | Litwin | F02C 1/05 |
| | | | | 60/641.8 |
| 2011/0051880 | A1 | 3/2011 | Al-Mayahi et al. | |
| 2013/0145759 | A1 | 6/2013 | Sonwane et al. | |
| 2014/0053529 | A1* | 2/2014 | Allam | F01K 25/103 |
| | | | | 60/726 |
| 2014/0103661 | A1* | 4/2014 | Kacludis | F02C 1/04 |
| | | | | 290/54 |
| 2015/0184502 | A1 | 7/2015 | Krish et al. | |
| 2015/0292310 | A1* | 10/2015 | Ghasripoor | E21B 43/2607 |
| | | | | 166/66.4 |
| 2016/0047361 | A1 | 2/2016 | Al-Sulaiman | |
| 2016/0138649 | A1 | 5/2016 | Anderson et al. | |
| 2016/0160881 | A1* | 6/2016 | Anderson | F04F 13/00 |
| | | | | 415/90 |
| 2016/0160888 | A1* | 6/2016 | Morphew | F04F 13/00 |
| | | | | 92/61 |
| 2016/0298500 | A1 | 10/2016 | Peter et al. | |
| 2016/0305289 | A1* | 10/2016 | Hwang | F01K 7/32 |
| 2017/0045272 | A1* | 2/2017 | Bandhauer | F01K 11/02 |
| 2017/0130743 | A1* | 5/2017 | Anderson | F04F 13/00 |
| 2017/0167442 | A1* | 6/2017 | Kawaguchi | F04B 39/06 |
| 2017/0350428 | A1* | 12/2017 | Martin | F15D 1/02 |
| 2018/0094547 | A1* | 4/2018 | Cha | F01K 11/02 |
| 2018/0094580 | A1* | 4/2018 | Amos | F02C 9/18 |
| 2019/0003386 | A1* | 1/2019 | Stapp | F02C 1/10 |
| 2019/0010834 | A1* | 1/2019 | Ford | H02K 7/1823 |
| 2019/0153903 | A1 | 5/2019 | Miller et al. | |

OTHER PUBLICATIONS

International Search Report and Written Opinion for International Application No. PCT/US2019/039334, dated Jan. 7, 2020, 15 Pages.

* cited by examiner

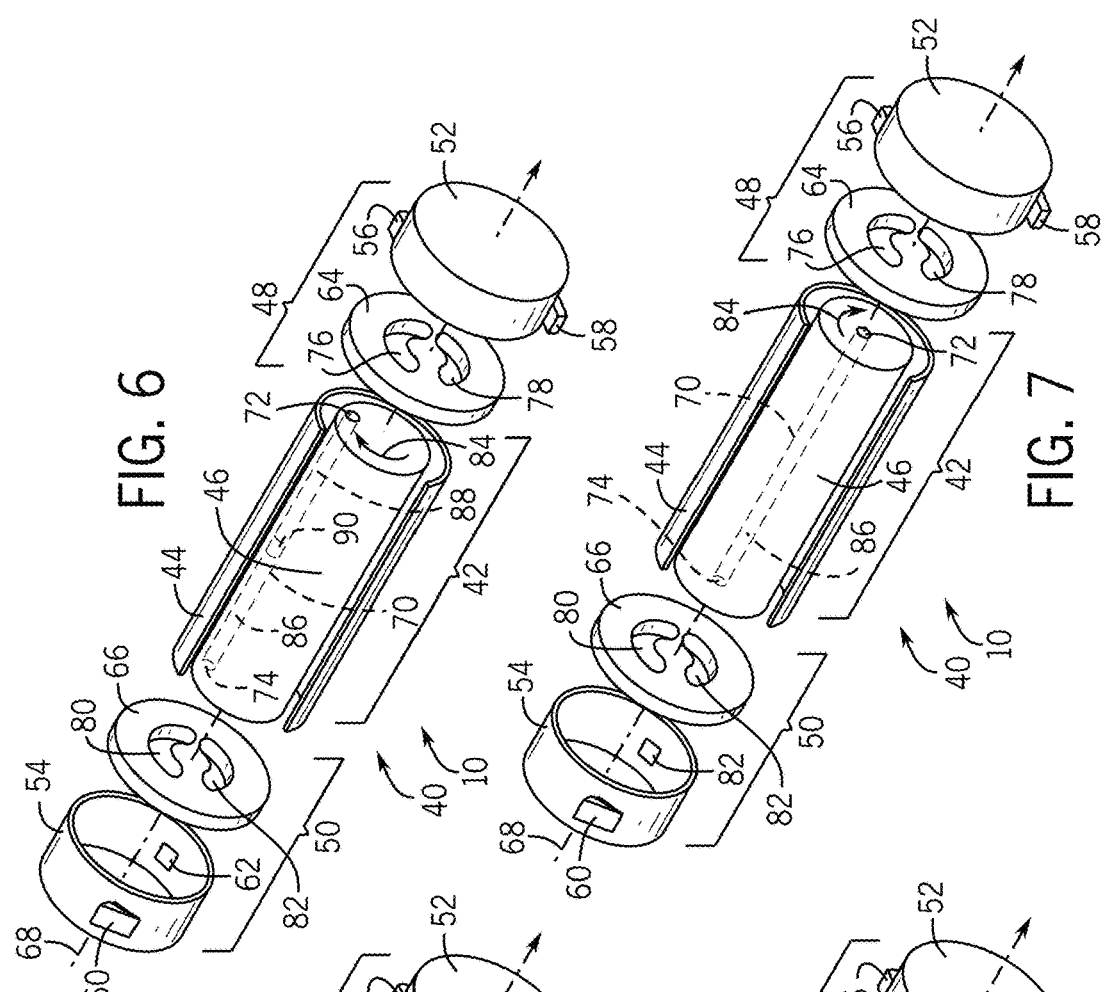

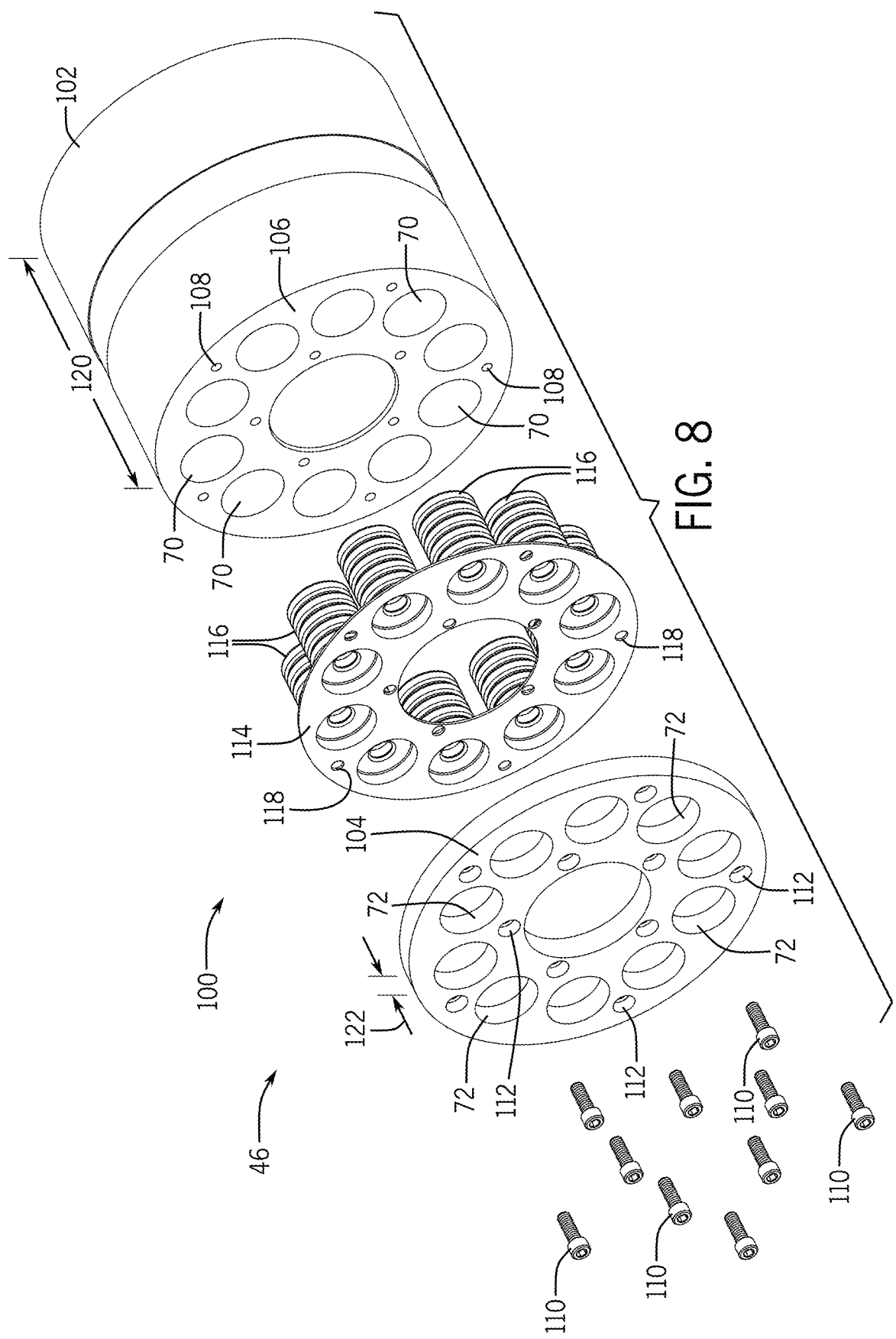

POWER GENERATION SYSTEM WITH ROTARY LIQUID PISTON COMPRESSOR FOR TRANSCRITICAL AND SUPERCRITICAL COMPRESSION OF FLUIDS

RELATED APPLICATIONS

This application claims priority to U.S. patent application Ser. No. 16/452,236, filed on Jun. 25, 2019, which claims the benefit of U.S. Provisional Patent Application No. 62/690,177, filed Jun. 26, 2018, the contents of which are herein incorporated by reference in their entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many power generation systems use the flow of fluids to produce electrical power. For example, hydroelectric power plants use the potential energy of water to drive a turbine. Another example is a power generation systems that use the Rankine cycle. These systems typically burns a fossil fuel such as coal, oil, or natural gas to turn liquid water into steam. The high-pressure steam is then directed through a turbine. As the steam expands in the turbine, the steam flows past turbine blades coupled to rotors. The force of the steam causes the rotors to rotate, which in turn rotate a shaft coupled to a generator. The rotation of the shaft enables the generator to convert rotational energy into electrical power. Increased efficiency of power generation systems may reduce the cost of power production as well as its availability.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a rotary liquid piston compressor and a power generation system including a first fluid loop. The first fluid loop includes a pump that circulates a liquid. A second fluid loop that generates power by circulating a supercritical fluid. The second fluid loop includes a turbine that rotates and powers a generator as the supercritical fluid flows through the turbine. A rotary liquid piston compressor fluidly coupled to the first fluid loop and the second fluid loop. The rotary liquid piston compressor exchanges pressure between the liquid circulating in the first fluid loop and the supercritical fluid circulating in the second fluid loop.

In an embodiment, a system that includes a rotary liquid piston compressor that exchanges pressure between a liquid and a supercritical fluid. The rotary liquid piston compressor includes a rotor that exchanges pressure between the liquid and the supercritical fluid as the rotor rotates. The rotor defines a plurality of channels that extend through the rotor. A plurality of barriers block mixing between the liquid and the supercritical fluid. The plurality of barriers rest within the rotor. Each channel of the plurality of channels receives a barrier of the plurality of barriers.

In an embodiment, a system including a rotary liquid piston compressor that exchanges pressure between a liquid and a supercritical fluid. The rotary liquid piston compressor includes a rotor that exchanges pressure between the liquid and the supercritical fluid as the rotor rotates. The rotor defines a plurality of channels that extend through the rotor. A thermal management system surrounds at least a portion of the rotor. The thermal management system exchanges heat with the rotary liquid piston compressor.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 4 is an exploded perspective view of an embodiment of a rotary LPC in a first operating position;

FIG. 5 is an exploded perspective view of an embodiment of a rotary LPC in a second operating position;

FIG. 6 is an exploded perspective view of an embodiment of a rotary LPC in a third operating position;

FIG. 7 is an exploded perspective view of an embodiment of a rotary LPC in a fourth operating position;

FIG. 8 is an exploded view of an embodiment of a rotor with a barrier system;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The discussion below describes a power generation system that includes a rotary liquid piston compressor or rotary liquid piston pump that pressurizes a process or working fluid (e.g., a fluid in supercritical state or liquid state or gas state) using a motive fluid (e.g., a liquid). As will be explained below, the power generation system may operate more efficiently by transferring work and/or pressure from a liquid to a supercritical fluid, liquid, and/or gas using a rotary liquid piston compressor or rotary liquid piston pump.

In operation, the rotary liquid piston compressor or pump may or may not completely equalize pressures between the first and second fluids. Accordingly, the rotary liquid piston compressor or pump may operate isobarically, or substantially isobarically (e.g., wherein the pressures of the first and second fluids equalize within approximately +/−1, 2, 3, 4, 5, 6, 7, 8, 9, or 10 percent of each other). Rotary liquid piston compressors or pumps may be generally defined as devices that transfer fluid pressure between a high-pressure inlet stream and a low-pressure inlet stream at efficiencies in excess of approximately 50%, 60%, 70%, 80%, or 90%

Figure 1:
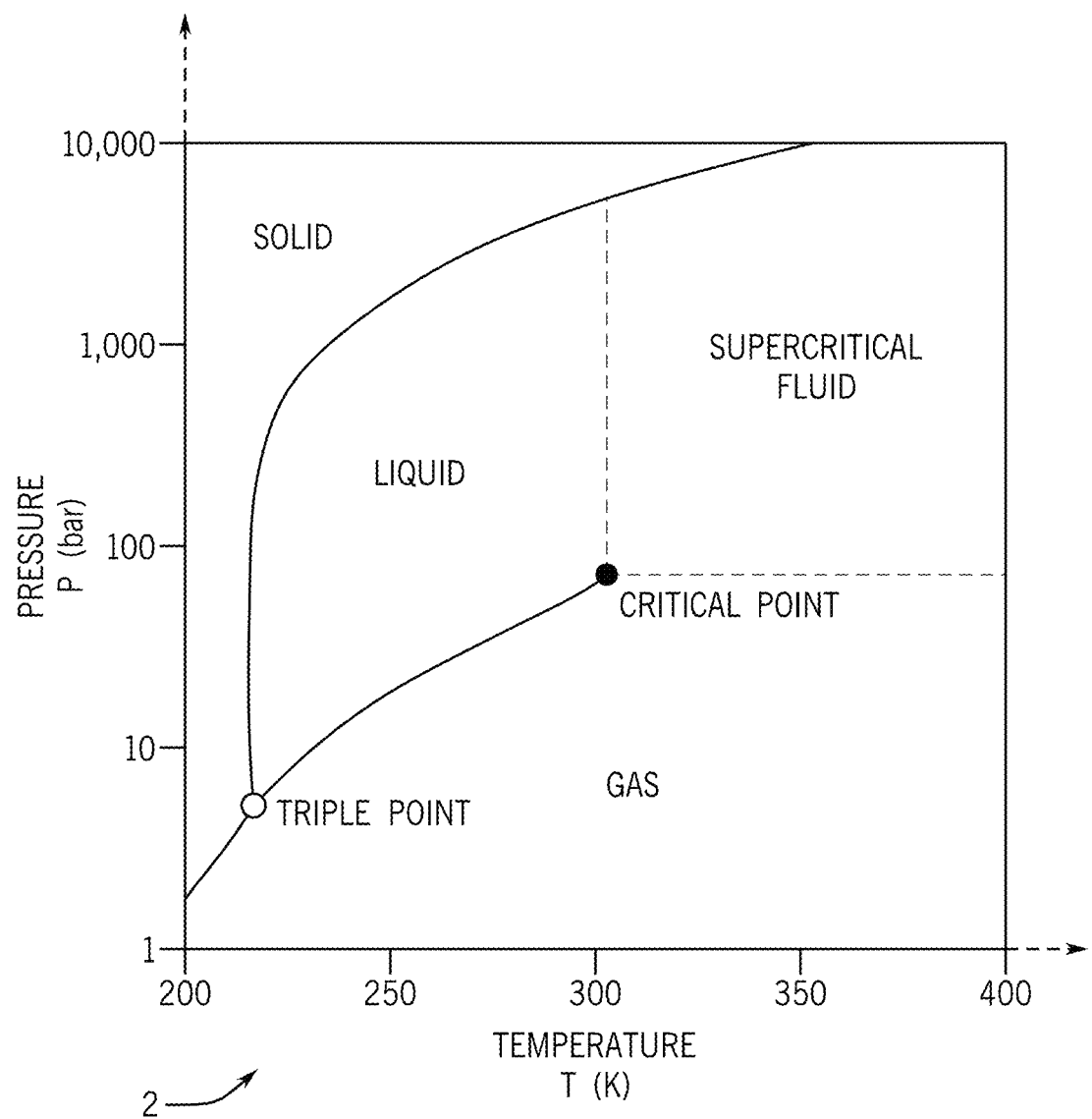
FIG. 1 is a phase diagram of carbon dioxide.

FIG. 1 is a phase diagram 2 of carbon dioxide. Phase diagrams represent equilibrium limits of various phases in a chemical system with respect to temperature and pressure. The phase diagram 2 of FIG. 1 illustrates how carbon dioxide changes phases (e.g., gas, liquid, solid, supercritical) as temperature and pressure changes. In addition to illustrating when carbon dioxide exists as a gas, a liquid, and a solid, the phase diagram 2 illustrates when carbon dioxide changes into supercritical fluid. When a compound is subjected to pressure and a temperature greater than its critical point it becomes a supercritical fluid. The critical point is the point at which surface tension (meniscus) that distinguishes the liquid and gas phases of a substance vanishes and the two phases become indistinguishable. In the supercritical region, the fluid exhibits particular properties. These properties may include gases having liquid-like (e.g., order of magnitude higher) densities, specific heats, viscosities and speed of sound through them.

Figure 2:
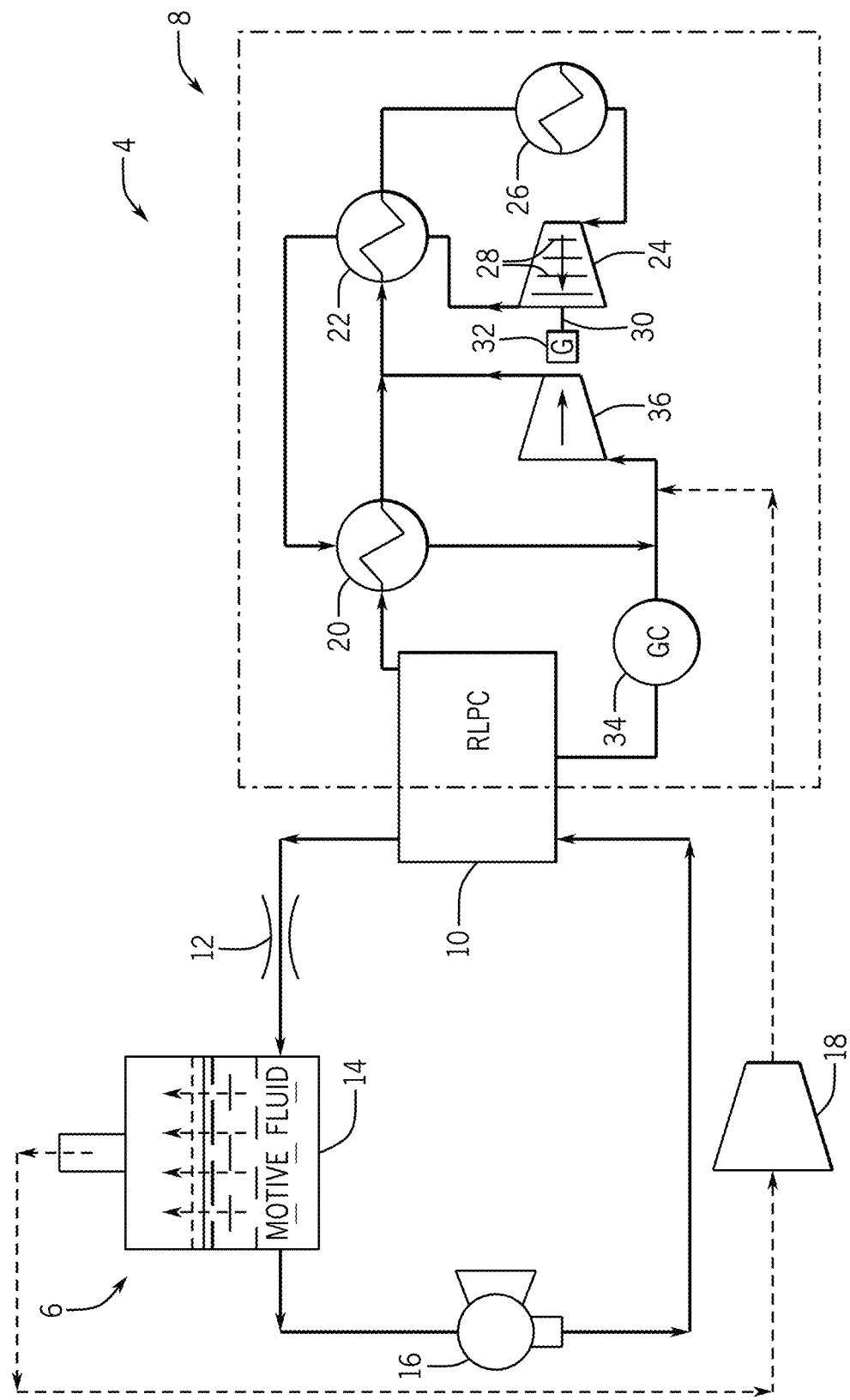
FIG. 2 is a schematic view of an embodiment of a power generation system with a rotary liquid piston compressor (RLPC)

FIG. 2 is a schematic view of an embodiment of a power generation system 4 that uses a fluid in a supercritical state (e.g., supercritical carbon dioxide, helium, supercritical steam, organic fluids) to generate power. By using a supercritical fluid in the power generation system 4, the overall efficiency of the power generation system 4 may increase. More specifically, the liquid-like densities and very high specific heats around the critical point may enable much higher energy densities (power produced per unit size of the turbomachine) than is possible with a Rankine cycle system (e.g., steam turbine system). The liquid-like densities and very high specific heats around the critical point may also enable orders of magnitude reduction in size of the turbines due to the increased energy concentration.

While supercritical fluids have liquid-like densities, they are not liquids. Accordingly, compressing a supercritical state fluid (e.g., carbon dioxide) may not be as efficient as pumping a liquid (e.g. water). As illustrated, the power generation system 4 includes a first fluid loop 6 that circulates a first or motive fluid that is predominantly liquid (e.g., water) and a second fluid loop 8 that circulates a second fluid in a supercritical state (e.g., supercritical carbon dioxide). The first fluid loop 6 and the second fluid loop 8 exchange energy with a rotary liquid piston compressor 10 enabling the motive fluid in the first fluid loop 6 to pressurize and compress or pump the second fluid through the second fluid loop 8. In this way, the overall efficiency of the power generation system 4 may increase as the more efficient process of pumping a liquid is used to transfer work and pressure from the first fluid loop 6 to the second fluid in the second fluid loop 8. Furthermore, the heat generated during compression of the second fluid can be carried away through direct contact with the motive liquid and in turn maintain an iso-thermal compression process, which increases thermodynamic efficiency of the compression process.

The first fluid loop 6 begins with transferring energy from the motive fluid (e.g., water) to the second fluid in the second fluid loop 8. After transferring energy, the motive fluid may flow through an orifice or valve (e.g., choke) 12, which reduces the pressure of the motive fluid before entering the evaporator chamber 14 (e.g., low-pressure evaporator chamber). However, in some embodiments the first fluid loop 6 may not include the evaporator chamber 14. The evaporator chamber 14 enables small trace amounts of second fluid that may have mixed with the motive fluid to change phases into a gas and thus separate from the motive fluid within the evaporator chamber 14. In other words, by reducing the pressure of the motive fluid in the orifice or valve 12, the pressure of the second fluid mixed with the motive fluid also decreases enabling the second fluid to change phases into a gas and separate from the motive fluid. After exiting the evaporator chamber 14, the motive fluid enters the pump 16, which again pressurizes the motive fluid and drives the motive fluid into the rotary liquid piston compressor 10 where the motive fluid again compresses and drives the second fluid through the second fluid loop 8. In some embodiments, the gaseous phase of the second fluid circulating in the second fluid loop 8 may be vented to the environment after separating from the motive fluid. In other embodiments, the gas may be captured, compressed, and then reinjected into the second fluid loop 8 with a compressor 18 to maintain a "closed loop" configuration of the system.

After exiting the rotary liquid piston compressor 10, the second fluid may flow through a first recuperator 20 (e.g., lower temperature recuperator) and then through a second recuperator 22 (e.g., high temperature recuperator). In these recuperators 20, 22 the second fluid absorbs energy from the second fluid exiting the turbine 24 thus raising its temperature. After passing through the second recuperator 22, the second fluid flows through a heater 26, which raises the temperature and pressure of the second fluid. The heater 26 may be a fossil fuel fired heater or a concentrated solar power receiver. The heat for the heater 26 can also come from the waste heat of a traditional gas turbine power plant. The second fluid then enters the turbine 24. As the second fluid flows through the turbine 24, it contacts turbine blades coupled to disks 28 (e.g., rotors) driving rotation of the disks 28. The bladed disks 28 in turn rotate a shaft 30 coupled to a generator 32. The generator 32 then converts the rotation of the shaft 30 into electrical power. As the second fluid flows through the turbine 24 it expands and decreases in pressure and temperature. The second fluid then exits the turbine 24 and flows through the first and second recuperators 20 and 22 exchanging energy with the second fluid exiting the rotary liquid piston compressor 10. In some embodiments, the second fluid may flow through a cooler 34 reducing the temperature of the second fluid and increasing its density. The second fluid then enters the rotary liquid piston compressor 10 where it is again compressed and driven through the second fluid loop 8.

Figure 3:
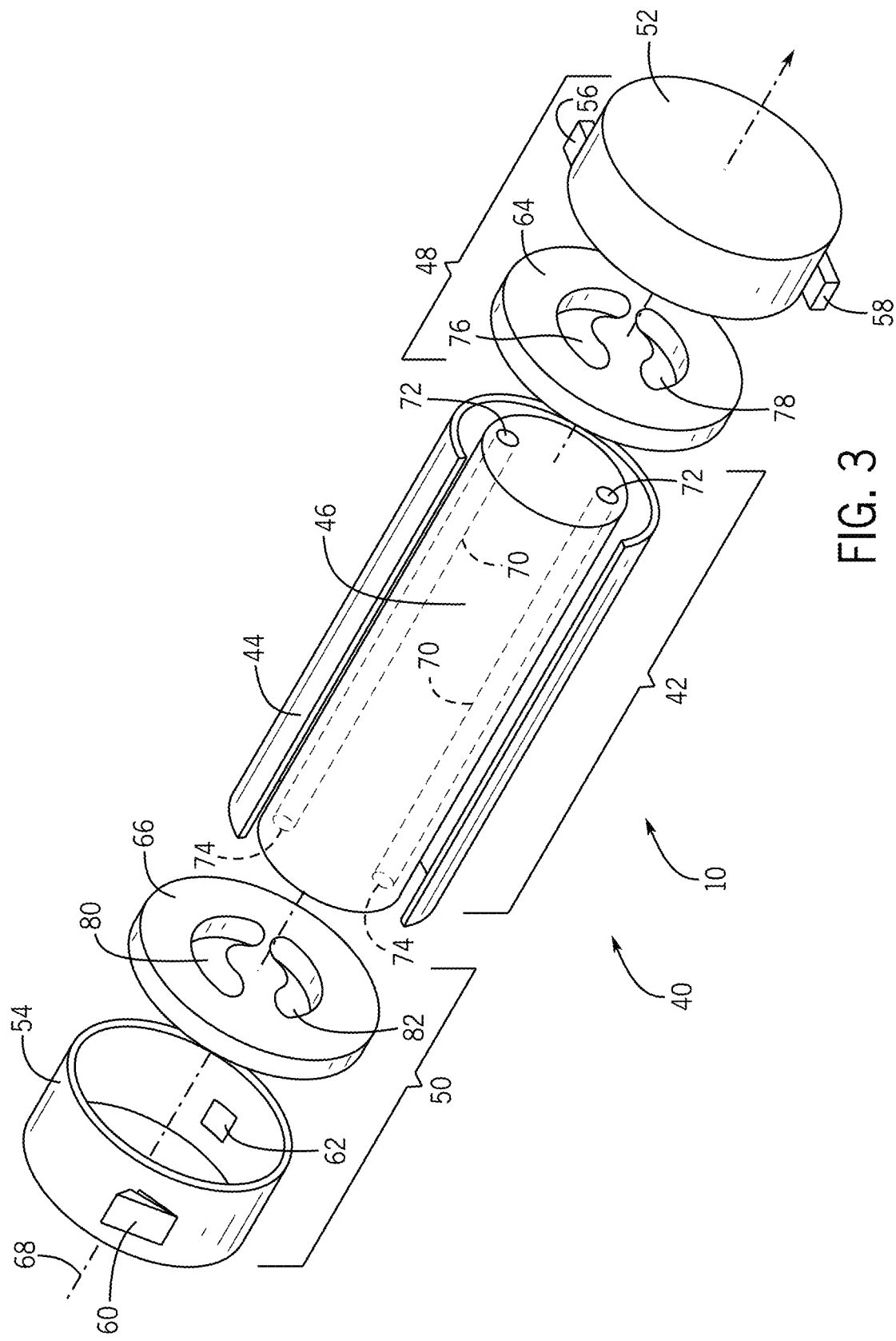
FIG. 3 is an exploded perspective view of an embodiment of a rotary LPC.

FIG. 3 is an exploded perspective view of an embodiment of a rotary liquid piston compressor 40 (rotary LPC) capable of transferring pressure and/or work between a first fluid (e.g., a liquid circulating in the first fluid loop 6) and a second fluid (e.g., supercritical carbon dioxide circulating in the second fluid loop 8) with minimal mixing of the fluids. The rotary LPC 40 may include a generally cylindrical body portion 42 that includes a sleeve 44 (e.g., rotor sleeve) and a rotor 46. The rotary LPC 40 may also include two end caps 48 and 50 that include manifolds 52 and 54, respectively. Manifold 52 includes respective inlet and outlet ports 56 and 58, while manifold 54 includes respective inlet and outlet ports 60 and 62. In operation, these inlet ports 56, 60 enabling the first and second fluids to enter the rotary LPC 40 to exchange pressure, while the outlet ports 58, 62 enable the first and second fluids to then exit the rotary LPC 40. In operation, the inlet port 56 may receive a high-pressure first fluid, and after exchanging pressure, the outlet port 58 may be used to route a low-pressure first fluid out of the rotary LPC 40. Similarly, the inlet port 60 may receive a low-pressure second fluid and the outlet port 62 may be used to route a high-pressure second fluid out of the rotary LPC 40. The end caps 48 and 50 include respective end covers 64 and 66 disposed within respective manifolds 52 and 54 that enable fluid sealing contact with the rotor 46. The rotor 46 may be cylindrical and disposed in the sleeve 44, which enables the rotor 46 to rotate about the axis 68. The rotor 46 may have a plurality of channels 70 extending substantially longitudinally through the rotor 46 with openings 72 and 74 at each end arranged symmetrically about the longitudinal axis 68. The openings 72 and 74 of the rotor 46 are arranged for hydraulic communication with inlet and outlet apertures 76 and 78; and 80 and 82 in the end covers 64 and 66, in such a manner that during rotation the channels 70 are exposed to fluid at high-pressure and fluid at low-pressure. As illustrated, the inlet and outlet apertures 76 and 78; and 80 and 82 may be designed in the form of arcs or segments of a circle (e.g., C-shaped).

In some embodiments, a controller using sensor feedback (e.g. revolutions per minute measured through a tachometer or optical encoder or volume flow rate measured through flowmeter) may control the extent of mixing between the first and second fluids in the rotary LPC 40, which may be used to improve the operability of the fluid handling system. For example, varying the volume flow rates of the first and second fluids entering the rotary LPC 40 allows the plant operator (e.g., system operator) to control the amount of fluid mixing within the rotary liquid piston compressor 10. In addition, varying the rotational speed of the rotor 46 also allows the operator to control mixing. Three characteristics of the rotary LPC 40 that affect mixing are: (1) the aspect ratio of the rotor channels 70, (2) the duration of exposure between the first and second fluids, and (3) the creation of a fluid barrier (e.g., an interface) between the first and second fluids within the rotor channels 70. First, the rotor channels 70 are generally long and narrow, which stabilizes the flow within the rotary LPC 40. In addition, the first and second fluids may move through the channels 70 in a plug flow regime with minimal axial mixing. Second, in certain embodiments, the speed of the rotor 46 reduces contact between the first and second fluids. For example, the speed of the rotor 46 may reduce contact times between the first and second fluids to less than approximately 0.15 seconds, 0.10 seconds, or 0.05 seconds. Third, a small portion of the rotor channel 70 is used for the exchange of pressure between the first and second fluids. Therefore, a volume of fluid remains in the channel 70 as a barrier between the first and second fluids. All these mechanisms may limit mixing within the rotary LPC 40. Moreover, in some embodiments, the rotary LPC 40 may be designed to operate with internal pistons or other barriers, either complete or partial, that isolate the first and second fluids while enabling pressure transfer.

FIGS. 4-7 are exploded views of an embodiment of the rotary LPC 40 illustrating the sequence of positions of a single rotor channel 70 in the rotor 46 as the channel 70 rotates through a complete cycle. It is noted that FIGS. 3-6 are simplifications of the rotary LPC 40 showing one rotor channel 70, and the channel 70 is shown as having a circular cross-sectional shape. In other embodiments, the rotary LPC 40 may include a plurality of channels 70 with the same or different cross-sectional shapes (e.g., circular, oval, square, rectangular, polygonal, etc.). Thus, FIGS. 3-6 are simplifications for purposes of illustration, and other embodiments of the rotary LPC 40 may have configurations different from that shown in FIGS. 4-7. As described in detail below, the rotary LPC 40 facilitates pressure exchange between first and second fluids by enabling the first and second fluids to briefly contact each other within the rotor 46. In certain embodiments, this exchange happens at speeds that result in limited mixing of the first and second fluids. More specifically, the speed of the pressure wave traveling through the rotor channel 70 (as soon as the channel is exposed to the aperture 76), the diffusion speeds of the fluids, and the rotational speed of rotor 46 dictate whether any mixing occurs and to what extent.

In FIG. 4, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. As will be discussed below, the rotor 46 may rotate in the clockwise direction indicated by arrow 84. In operation, low-pressure second fluid 86 passes through end cover 66 and enters the channel 70, where it contacts the first fluid 88 at a dynamic fluid interface 90. The second fluid 86 then drives the first fluid 88 out of the channel 70, through end cover 64, and out of the rotary LPC 40. However, because of the short duration of contact, there is minimal mixing between the second fluid 86 and the first fluid 88.

In FIG. 5, the channel 70 has rotated clockwise through an arc of approximately 90 degrees. In this position, the opening 74 (e.g. outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

In FIG. 6, the channel 70 has rotated through approximately 60 degrees of arc from the position shown in FIG. 6. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86 driving the second fluid 86 out of the rotor channel 70 and through the aperture 80.

In FIG. 7, the channel 70 has rotated through approximately 270 degrees of arc from the position shown in FIG. 7. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

FIG. 8 is an exploded view of an embodiment of a rotor 46 with a barrier system 100. As explained above, rotation of the rotor 46 enables pressure transfer between first and second fluids. In order to block mixing between the first fluid/motive fluid and the second fluid/supercritical fluid in the power generation system 4, the rotary liquid piston compressor 10 includes the barrier system 100. As illustrated, the rotor 46 includes a first rotor section 102 and a second rotor section 104 that couple together. By including a rotor 46 with first and second rotor sections 102, 104 the rotor 46 is able to receive and hold the barrier system 100 within rotor 46. As illustrated, the first rotor section 102 includes an end face 106 with apertures 108 that receive bolts 110. The bolts 110 pass through these apertures 108 and enter apertures 112 in the second rotor section 104 to couple the first and second sections 102, 104 of the rotor 46. The barrier system 100 is placed between these rotor sections 102, 104 enabling the rotor 46 to secure the barrier system 100 to the rotor 46.

The barrier system 100 may include a plate 114 with a plurality of barriers 116 coupled to the plate 114. These barriers 116 are foldable diaphragms that block contact/mixing between the first and second fluids as they exchange pressure in the channel 70 of the rotor 46. As will be discussed below, these barriers 116 expand and contract as pressure is transferred between the first and second fluids. In order to couple the plate 114 to the rotor 46, the plate 114 may include a plurality of apertures 118 that align with the apertures 108 in the first rotor section 102 and the apertures 112 in the second rotor section 104. These apertures 118 receive the bolts 110 when the first rotor section 102 couples to the second rotor section 104 reducing or blocking lateral movement of the plate 114. In some embodiments, the apertures 108 on the first rotor section 102, the apertures 112 on the second rotor section 104, and the apertures 118 on the plate 114 may be placed on one or more diameters (e.g., an inner diameter and an outer diameter). In this way, the first rotor section 102 and the second rotor section 104 may evenly compress the plate 114 when coupled. In some embodiments, the barriers 116 may not couple to or be supported by the plate 114. Instead, each barrier 116 may couple individually to the rotor 46.

As illustrated, the first rotor section 102 defines a length 120 and the second rotor section 104 defines a length 122. By changing the length 120 and 122, the rotor 46 enables the barrier system 100 to be placed at different positions in the channels 70 along the length of the rotor 46. In this way, the rotary liquid piston compressor 10 may be adapted in response to various operating conditions. For example, differences in density and mass flow rates of the two fluids and the rotational speed of the rotor 46 among others may affect how far the first and second fluids are able to flow into the channels 70 of the rotor 46 to exchange pressure. Accordingly, changing the lengths 120 and 122 of the first and second rotor sections 102 and 104 of the rotor 46 enables placement of the barrier system 100 in a position that facilitates the pressure exchange between the first and second fluids (e.g., halfway through the rotor 46).

In some embodiments, the power generation system 4 may modify the fluids circulating in the first and second loops 6 and 8 to resist mixing in the rotary liquid piston compressor 10. For example, the power generation system 4 may use an ionic fluid in the first loop 6 that may prevent diffusion and solubility of the supercritical fluid into the motive fluid, or in other words may resist mixing with the supercritical fluid. Modifying of the fluids in the power generation system 4 may also be used in combination with the barrier system 100 to provide redundant resistance to mixing of fluids in the rotary liquid piston compressor 10.

Figure 9:
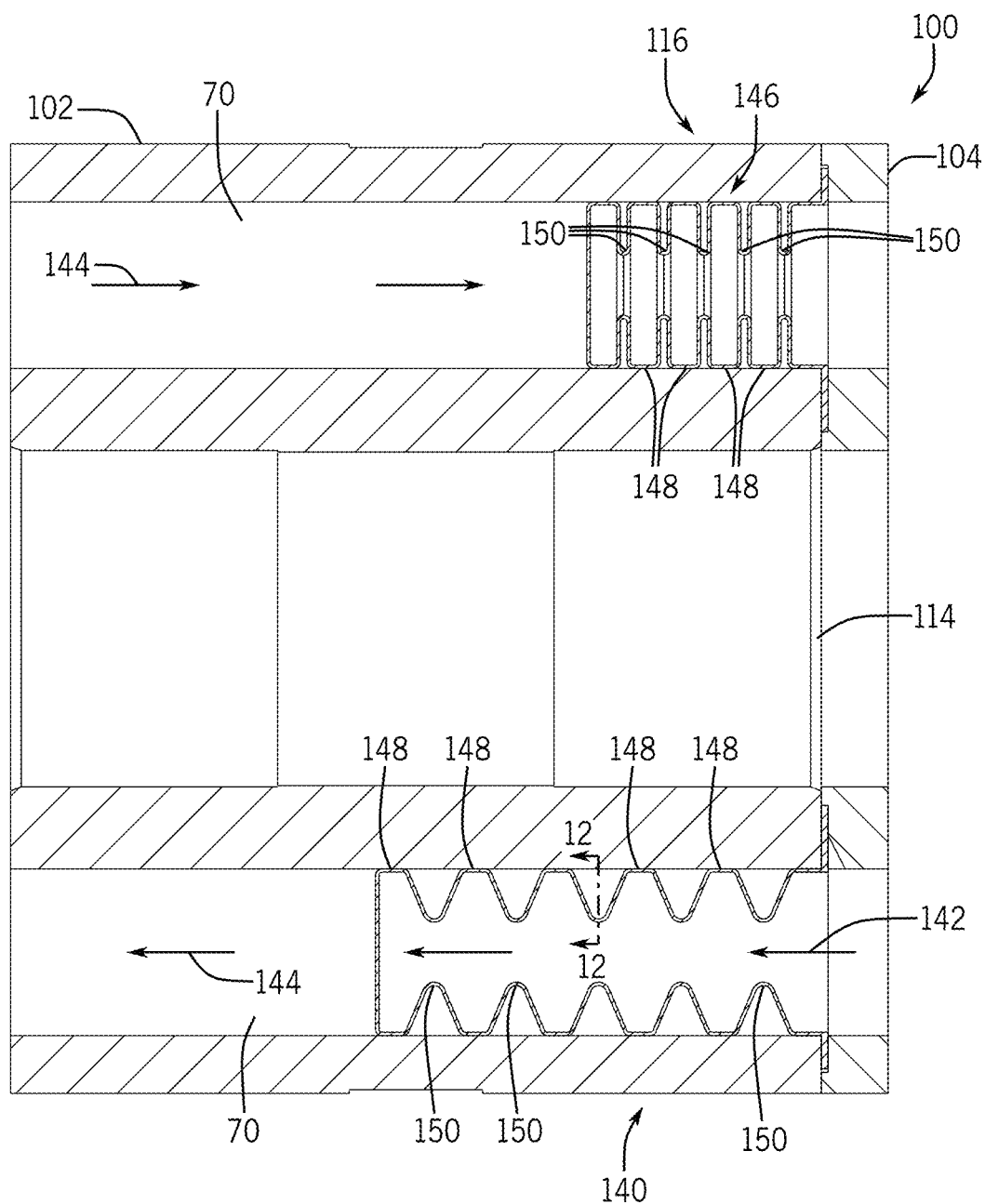
FIG. 9 is a cross-sectional view of an embodiment of a rotor with a barrier system.

FIG. 9 is a cross-sectional view of an embodiment of a rotor 46 with a barrier system 100. As explained above, the barrier system 100 may include the plate 114 and barriers 116. These barriers 116 rest within the channels 70 and block mixing/contact between the first and second fluids while still enabling pressure transfer. In order to facilitate pressure transfer, the barriers 116 expand and contract. As illustrated in FIG. 9, a first barrier 140 of the plurality of barriers 116 is in an expanded position. In operation, the first barrier 140 expands as the first fluid 142 flows into the rotor 46 and into the first barrier 140. As the first barrier 140 expands, it pressurizes the second fluid 144 driving it out of the rotor 46. Simultaneously, a second barrier 146 may be in a contracted state as the second fluid 144 enters the rotor 46 in preparation for being pressurized. The barriers 116 include a plurality of folds 148 (e.g., 1, 2, 3, 4, 5, or more) that couple together with ribs 150. It is these elastic folds 148 that enable the barriers 116 to expand in volume as the pressurized first fluid 142 flows into the rotor 46. As will be discussed below, the barriers 116 may be made of one or more materials that provide the tensile strength, elongation percentage, and chemical resistance to work with a supercritical fluid (e.g., carbon dioxide).

Figure 10:
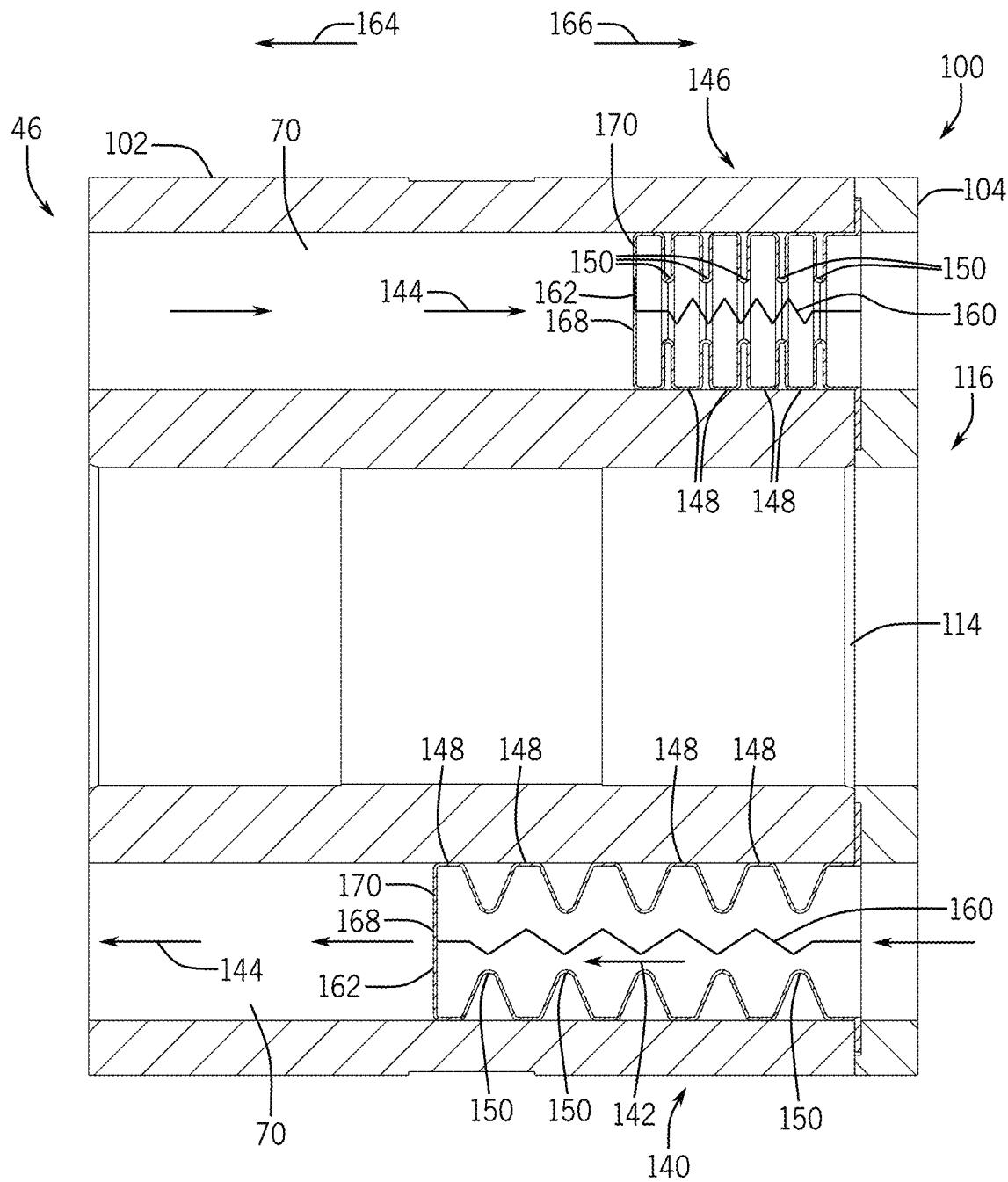
FIG. 10 is a cross-sectional view of an embodiment of a rotor with a barrier system.

FIG. 10 is a cross-sectional view of an embodiment of a rotor 46 with a barrier system 100. As illustrated in FIG. 10, a first barrier 140 of the plurality of barriers 116 is in an expanded position. In operation, the first barrier 140 expands as the first fluid 142 flows into the rotor 46 and into the first barrier 140. As the first barrier 140 expands the first barrier 140 contacts and pressurizes the second fluid 144 driving it out of the rotor 46. To reduce the stress in the barriers 116, the barrier system 100 may include springs 160. The springs 160 may couple to an end 162 (e.g., end portion, end face) of the barrier 116 and to the plate 114. In operation, the springs 160 stretch as pressure in the barriers 116 increases and the barriers 116 expand in axial direction 164. Because the springs 160 absorb force as the barrier 116 expands, the springs 160 may block or reduce overexpansion of the barriers 116. The springs 160 may also increase the longevity of the barriers 116 as the barriers 116 repeatedly expand and contract during operation of power generation system 4. The springs may also provide a more controlled rate of expansion of the barriers 116.

In some embodiments, the springs 160 may couple to an exterior surface 168 of the barriers 116 and/or be placed outside of the barriers 116. In other embodiments, the springs 160 may couple to an interior surface 170 and/or be placed within the barriers 116 (i.e., within the membrane of the barriers 116). In still other embodiments, the barrier system 100 may include springs 160 both outside of and inside the barriers 116. The springs 160 may also couple to the rotor 46 instead of coupling to the plate 114. For example, springs 160 may be supported by sandwiching a portion of the springs 160 between the first rotor section 102 and the second rotor section 104 of the rotor 46.

Figure 11:
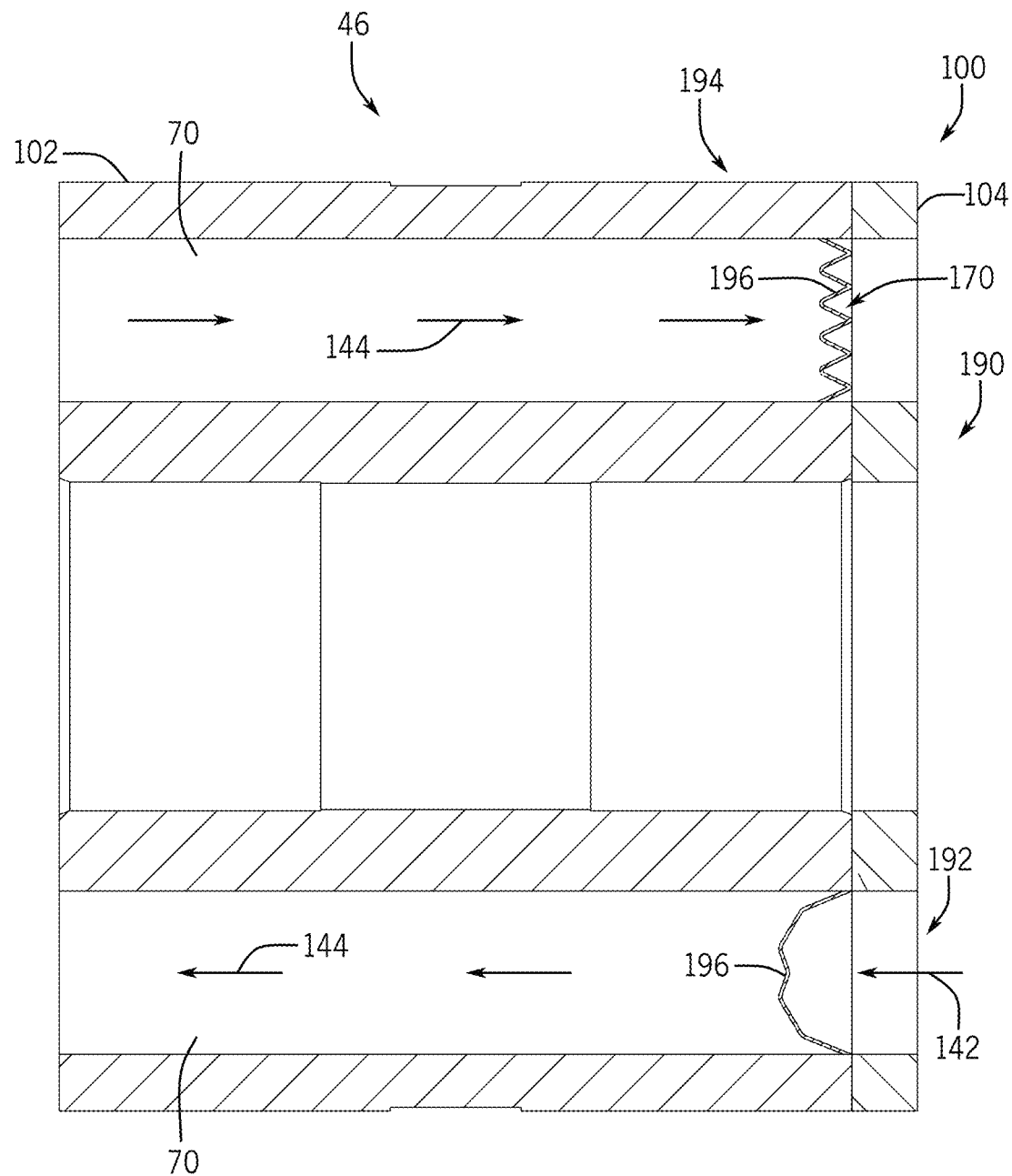
FIG. 11 is a cross-sectional view of an embodiment of a rotor with a barrier system.

FIG. 11 is a cross-sectional view of an embodiment of a rotor 46 with a barrier system 100. In FIG. 11, the barrier system 100 includes plane barriers 190. As illustrated, the plane barriers 190 extend across the channels 70 (e.g., in a generally crosswise direction to the longitudinal axis of the channel 70) instead of axially into the channels 70 as the barriers 116 described above. In operation, the plane barriers 190 block mixing/contact between the first and second fluids 142, 144 while still enabling pressure transfer. In order to facilitate pressure transfer the plane barriers 190 expand and contract under pressure. As illustrated in FIG. 11, a first plane barrier 192 of the plurality of plane barriers 190 is in an expanded position. The first plane barrier 192 expands as the first fluid 142 flow into the rotor 46 and into the first plane barrier 192. As the first plane barrier 192 expands under the pressure of the first fluid 142, the first plane barrier 192 contacts and pressurizes the second fluid 144 driving it out of the rotor 46. A second plane barrier 194 may also be simultaneously contracting as the second fluid 144 enters the rotor 46 in preparation for being pressurized. The barriers 116 include a plurality of folds 196 (e.g., 1, 2, 3, 4, 5, or more) that couple. It is these elastic folds 148 that expand as the pressurized first fluid 142 flows into the rotor 46 and contract when pressure is released.

Figure 12:
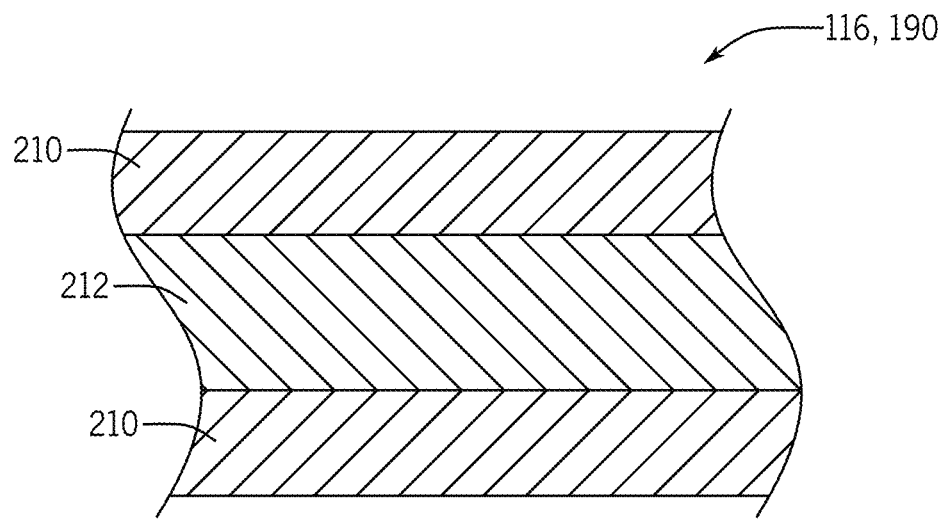
FIG. 12 is a cross-sectional view of an embodiment of a barrier along line 12-12 of FIG. 9.

FIG. 12 is a cross-sectional view of an embodiment of a barrier along line 12-12 of FIG. 9. The barriers 116 as well as the barriers 190 may be made of one or more materials that provide the tensile strength, elongation percentage, and chemical resistance to work with a supercritical fluid (e.g., carbon dioxide). For example, the barriers 116, 190 may include high stretch ratio elastomeric materials like ethylene propylene, silicone, nitrile, neoprene etc. The high stretch ratio capability of these materials enables the barriers 116, 119 to absorb the pressure from the first fluid 142 and transfer it to the second fluid 144. In some embodiments, the barriers 116, 119 may include multiple layers (e.g., 1, 2, 3, 4, 5, or more layers) of high stretch ratio materials sandwiched between layers of high strength fabric in order to combine high stretch ratio properties with high strength properties. For example, the barriers 116, 119 may include two elastomer layers 210 that overlap a fabric layer 212. In operation, the elastomer layers 210 may provide chemical resistance as well as high stretch ratio capacity, while the fabric layer 212 may increase overall tensile strength of the barrier 116, 190.

Figure 13:
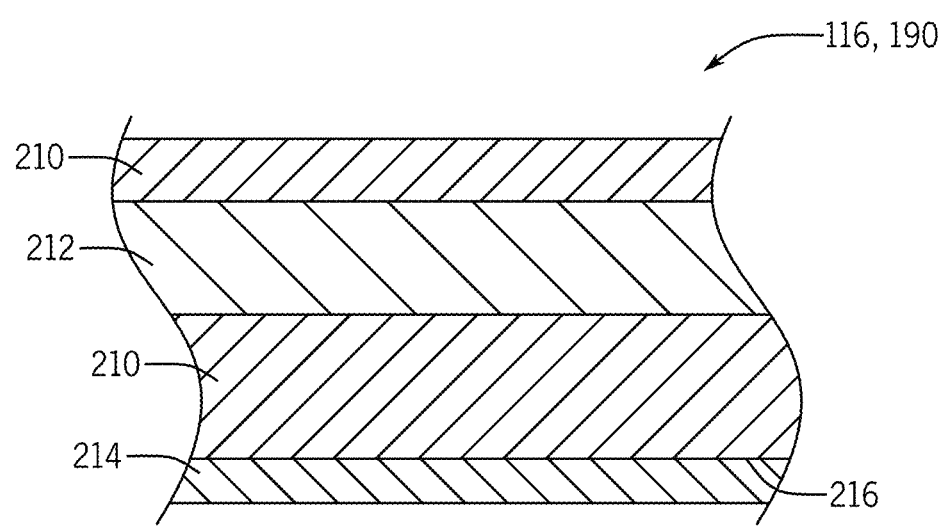
FIG. 13 is a cross-sectional view of an embodiment of a barrier along line 12-12 of FIG. 9.

FIG. 13 is a cross-sectional view of an embodiment of a barrier along line 12-12 of FIG. 9. As explained above, the barriers 116, 190 may be made of one or more materials that provide the tensile strength, elongation percentage, and chemical resistance to work with a supercritical fluid (e.g., temperature and pressures of a supercritical fluid). In some embodiments, the barriers 116, 119 may include multiple layers in order to combine properties of different materials (e.g., 1, 2, 3, 4, 5, or more layers). For example, the barriers 116, 119 may include two elastomer layers 210 (e.g., ethylene propylene, silicone, nitrile, neoprene etc.) that overlap a fabric layer 212). In operation, the elastomer layers 210 may provide chemical resistance as well as high stretch ratio capacity, while the fabric layer 212 increases tensile strength of the barrier 116, 190. Furthermore, one or more of the layers 210 may include a coating 214. The coating 214 may be a chemically resistant coating that resists reacting with the first fluid and/or the second fluid. For example, a layer 210 may include the coating 214 on an outermost surface 216 that chemically protects the layer 210 from the supercritical fluid.

Figure 14:
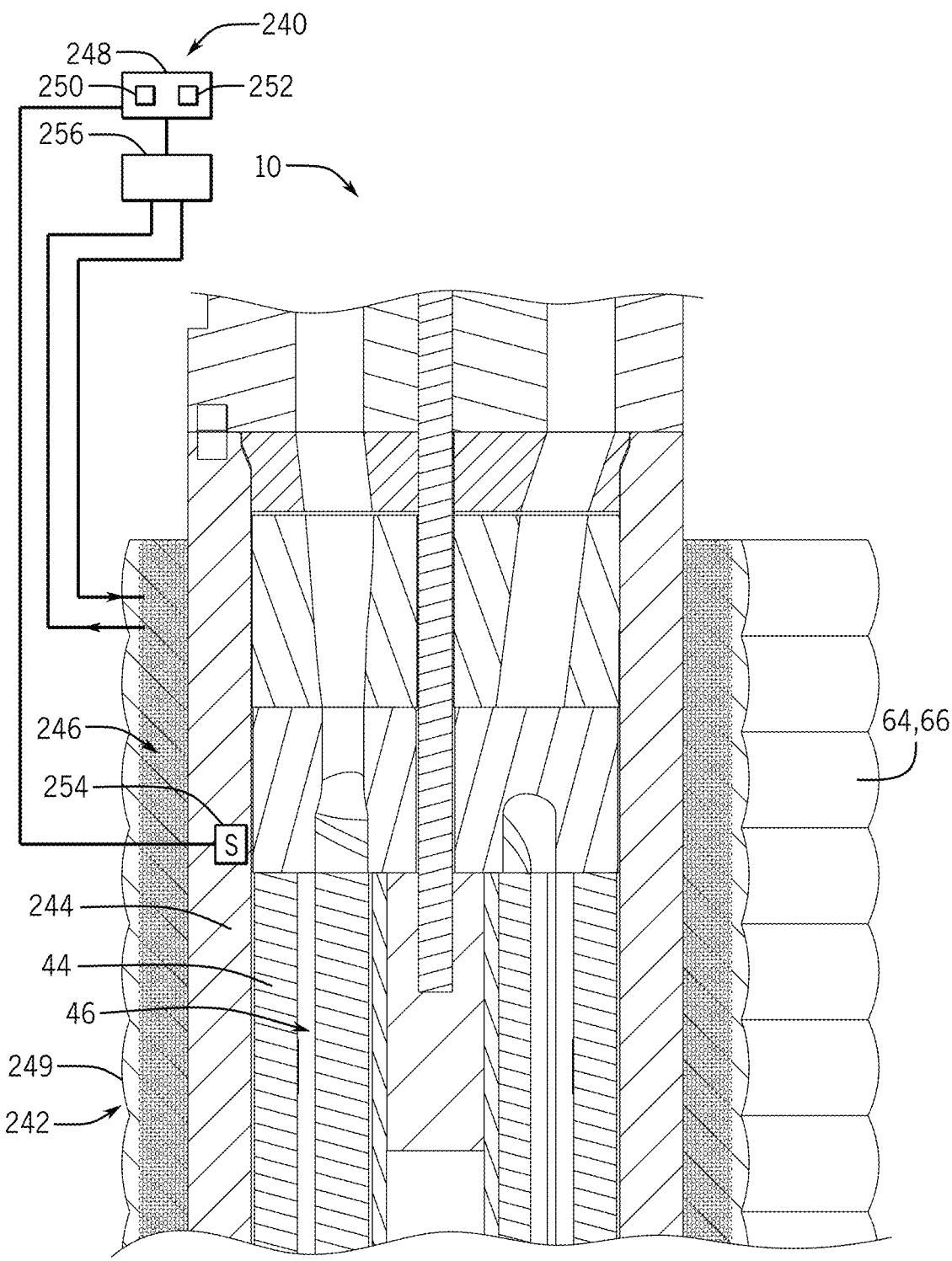
FIG. 14 is a cross-sectional view of an embodiment of a rotary liquid piston compressor with a cooling system.

FIG. 14 is a cross-sectional view of an embodiment of a rotary liquid piston compressor 10 (e.g., rotary LPC) with a cooling system 240 (i.e., thermal management system). In some embodiments, the cooling system 240 may include a micro-channel fabricated heat exchanger that surrounds the rotary liquid piston compressor. As explained above in the description of FIG. 1, fluids change phases as temperatures and pressures change. At a pressure and temperature greater than the critical point, the fluid becomes a supercritical fluid. The power generation system 4 uses a fluid (e.g., carbon dioxide) in its supercritical state/phase for power generation because of the unique properties of supercritical fluids (i.e., liquid-like densities and gas-like viscosities). By controlling the temperature in the rotary liquid piston compressor 10 with the cooling system 240, the cooling system 240 may block a phase change from supercritical fluid to gas phase inside the rotary liquid piston compressor 10. In addition, the cooling system 240 may also facilitate energy removal as heat is generated during compression of supercritical fluid, thus enabling a substantially iso-thermal compression, which is a thermodynamically more efficient mode of compression. As explained above, the cooling system 240 may include micro-channels, which provide high surface area per unit volume to facilitate heat transfer coefficients between the walls of the rotary liquid piston compressor 10 and the cooling fluid circulating through the cooling system 240.

The cooling system 240 includes a cooling jacket 242 that surrounds at least a portion of the rotary liquid piston compressor housing 244. The cooling jacket 242 may include a plurality of conduits 246 that wrap around the housing 244. These conduits 246 may be micro-conduits having a diameter between 0.05 mm and 0.5 mm. By including micro-conduits, the cooling system 240 may increase the cooling surface area to control the temperature of the supercritical fluid in the rotary liquid piston compressor 10. The conduits 246 may be arranged into a plurality of rows (e.g., 1, 2, 3, 4, 5, or more) and/or a plurality of columns (e.g., 1, 2, 3, 4, 5, or more). Each conduit 246 may be fluidly coupled to every other conduit 246 or the cooling system 240 may fluidly couple to subsets of the conduits 246. For example, every conduit 246 in a row may be fluidly coupled to the other conduits 246 in the row but not to the conduits 246 in other rows. In some embodiments, each conduit 246 may fluidly couple to the other conduits 246 in the same column, but not to conduits 246 in different columns. In some embodiments, the conduits 246 may be enclosed by a housing or covering 247. The housing or covering 247 may made from a material that insulates and resists heat transfer, such as polystyrene, fiberglass wool or various types of foams. The flow of cooling fluid through the conduits 246 may be controlled by a controller 248. The controller 248 may include a processor 250 and a memory 252. For example, the processor 250 may be a microprocessor that executes software to control the operation of the actuators 98. The processor 250 may include multiple microprocessors, one or more "general-purpose" microprocessors, one or more special-purpose microprocessors, and/or one or more application specific integrated circuits (ASICS), or some combination thereof. For example, the processor 250 may include one or more reduced instruction set (RISC) processors.

The memory 252 may include a volatile memory, such as random access memory (RAM), and/or a nonvolatile memory, such as read-only memory (ROM). The memory 252 may store a variety of information and may be used for various purposes. For example, the memory 252 may store processor executable instructions, such as firmware or software, for the processor 250 to execute. The memory may include ROM, flash memory, a hard drive, or any other suitable optical, magnetic, or solid-state storage medium, or a combination thereof. The memory may store data, instructions, and any other suitable data.

In operation, the controller 248 may receive feedback from one or more sensors 254 (e.g., temperature sensors, pressure sensors) that detects either directly or indirectly the temperature and/or pressure of the supercritical fluid. Using feedback from the sensors 254, the controller 248 controls the flowrate of cooling fluid from a cooling fluid source 256 (e.g., chiller system, air conditioning system).

Figure 15:
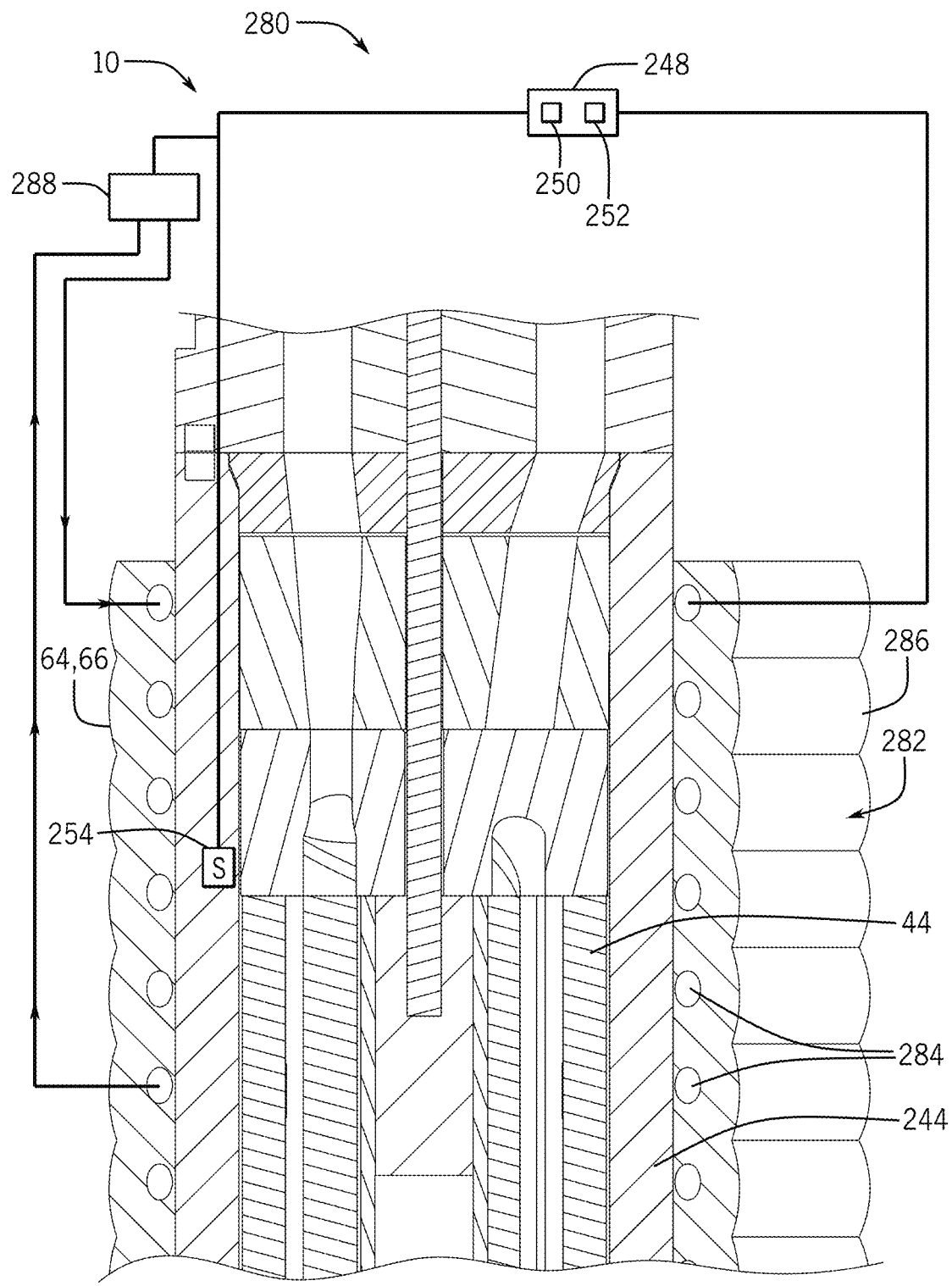
FIG. 15 is a cross-sectional view of an embodiment of a rotary liquid piston compressor with a heating system.

FIG. 15 is a cross-sectional view of an embodiment of a rotary liquid piston compressor 10 (RLPC) with a heating system 280 (i.e., thermal management system). In operation, the heating system 280 may control the temperature of the fluid (i.e., supercritical fluid) circulating through the rotary liquid piston compressor 10. By controlling the temperature, the heating system 280 may block or reduce condensation and/or dry ice formation of the fluid due to non-isentropic expansion.

The heating system 280 includes a heating jacket 282 that surrounds at least a portion of the rotary liquid piston compressor housing 244. The heating jacket 282 may include a plurality of conduits or cables 284 that wrap around the housing 244. These conduits or cables 284 enable temperature control of the supercritical fluid. For example, the conduits 284 may carry a heating fluid that transfers heat to the supercritical fluid. In some embodiments, the cable(s) 284 (e.g., coil) may carry electrical current that generates heat due to the electrical resistance of the cable(s) 284. The conduits 246 may also be enclosed by a housing or covering 286. The housing or covering 286 may be made from a material that insulates and resists heat transfer, such as polystyrene, fiberglass wool or various types of foams The flow of heating fluid or electric current through the conduits or cables 284 is controlled by the controller 248. In operation, the controller 248 may receive feedback from one or more sensors 254 (e.g., temperature sensors, pressure sensors) that detects either directly or indirectly the temperature and/or pressure of the supercritical fluid. For example, the sensors 254 may be placed in direct contact with the supercritical fluid (e.g., within a cavity containing the supercritical fluid). In some embodiments, the sensors 254 may be placed in the housing 244, sleeve 44, end covers 64, 66. As the material around the sensors 254 respond to changes in temperature and/or pressure of the supercritical fluid, the sensors 254 sense this change and communicate this change to the controller 248. The controller 248 then correlates this to a temperature and/or pressure of the actual supercritical fluid. Using feedback from the sensors 254, the controller 248 may control the flowrate of heating fluid from a heating fluid source 288 (e.g., boiler) through the conduits 284. Similarly, if the heating system 280 is an electrical resistance heating system, the controller 248 may control the flow of current through the cable(s) 284 in response to feedback from one or more of the sensors 254.

Figure 16:
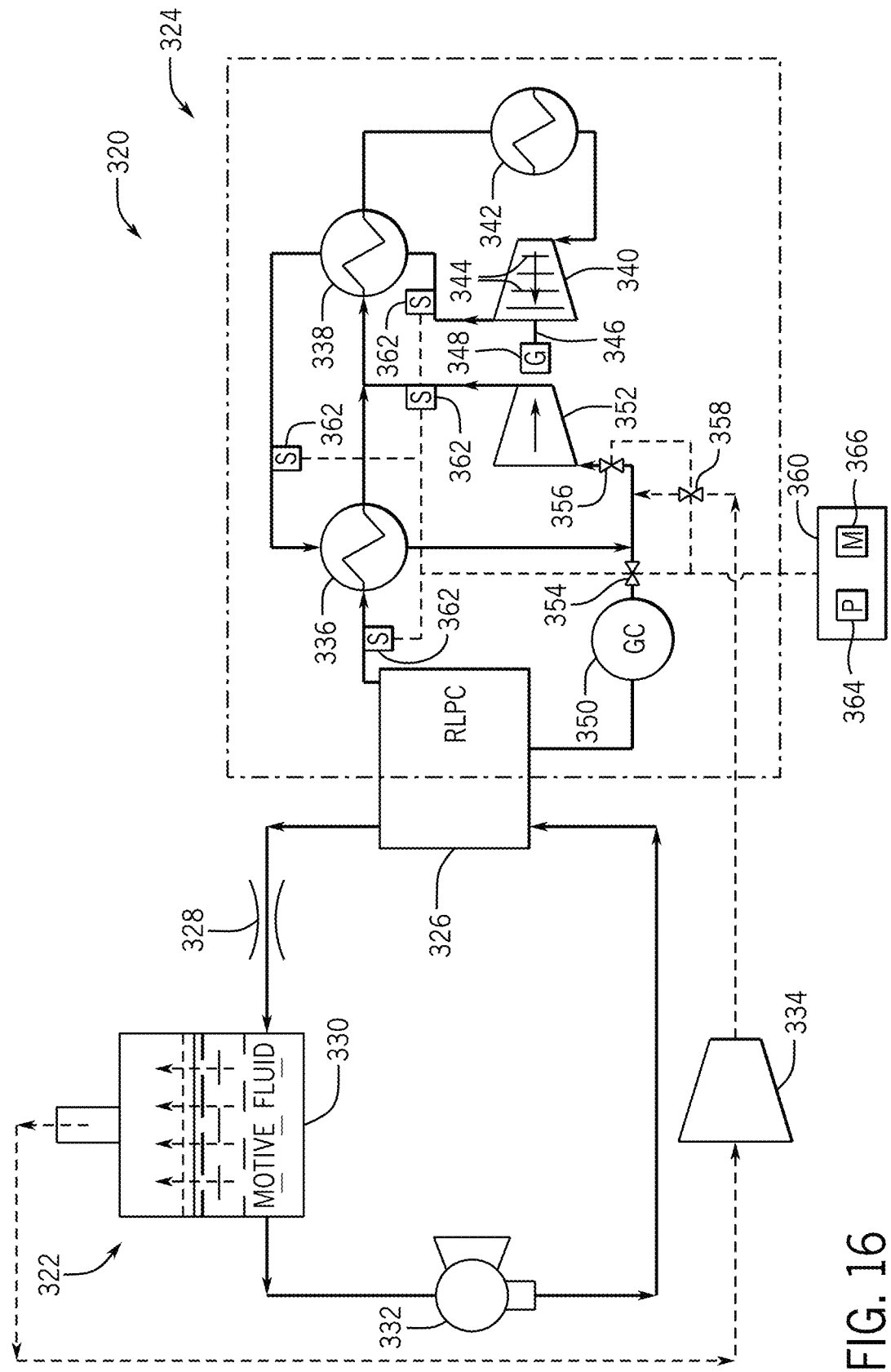
FIG. 16 is a schematic view of an embodiment of a power generation system.

FIG. 16 is a schematic view of an embodiment of a power generation system 320 that uses a supercritical fluid (e.g., supercritical carbon dioxide) to generate power. As explained above, by using a supercritical fluid in the power generation system 320, the overall efficiency of the power generation system 320 may increase. More specifically, the liquid-like densities and very high specific heats around the critical point may enable much higher energy densities (power produced per unit size of the turbomachine) than is possible with a Rankine cycle system (e.g., steam turbine system). The liquid-like densities and very high specific heats around the critical point may also enable orders of magnitude reduction in size of the turbines due to the increased energy concentration.

While supercritical fluids have liquid-like densities, they are not liquids. Accordingly, compressing a fluid in a supercritical state (e.g., supercritical carbon dioxide) using traditional mechanical compressors may use more energy than that used to pump a liquid. The power generation system 320 therefore pumps a motive fluid in a liquid state at high pressure to compress the process fluid in a supercritical state using fluid pressure exchange in a rotary liquid piston compressor. In this way, the power generation system 320 may reduce the energy involved in pumping a supercritical fluid. As illustrated, the power generation system 320 includes a first fluid loop 322 that circulates a motive fluid that is predominantly liquid (e.g., water) and a second fluid loop 324 that circulates a supercritical fluid (e.g., supercritical carbon dioxide). The first fluid loop 322 and the second fluid loop 324 exchange energy with a rotary liquid piston compressor 326 enabling the motive fluid in the first fluid loop 322 to pressurize and pump the supercritical fluid through the second fluid loop 324. In this way, the overall efficiency of the power generation system 320 may increase as the more efficient process of pumping a liquid is used to transfer work and pressure from the first fluid loop 322 to the supercritical fluid in the second fluid loop 324. Furthermore, the heat generated during compression of the supercritical fluid can be carried away through direct contact with the motive liquid and in turn maintain an iso-thermal compression process, which increases thermodynamic efficiency.

The first fluid loop 322 begins by transferring energy from the motive fluid (e.g., water) to the supercritical fluid in the second fluid loop 324 with the rotary liquid piston compressor 326. After transferring energy, the motive fluid may flow through an orifice or valve (e.g., choke) 328, which reduces the pressure of the motive fluid before entering the evaporator chamber 330 (e.g., low-pressure evaporator chamber). In some embodiments the first fluid loop 322 may not include the evaporator chamber 330. The evaporator chamber 330 enables small trace amounts of supercritical fluid that may have mixed with the motive fluid to change phases into a gas and thus separate from the motive fluid within the evaporator chamber 330. In other words, by reducing the pressure of the motive fluid in the orifice or valve 328, the pressure of the supercritical fluid mixed with the motive fluid also decreases enabling the supercritical fluid to change phases into a gas and separate from the motive fluid. After exiting the evaporator chamber 330, the motive fluid enters the pump 332, which again pressurizes the motive fluid and drives the motive fluid into the rotary liquid piston compressor 326 where the motive fluid again compresses and drives the supercritical fluid through the second fluid loop 324.

In some embodiments, the gaseous phase of the supercritical fluid circulating in the second fluid loop 324 may be vented to the environment after separating from the motive fluid. In other embodiments, the gas may be captured, compressed, and then reinjected into the second fluid loop 324 with a compressor 334 to maintain a "closed loop" configuration of the system.

After exiting the rotary liquid piston compressor 326, the supercritical fluid may flow through a first recuperator 336 (e.g., lower temperature recuperator) and then through a second recuperator 338 (e.g., high temperature recuperator). In these recuperators 336, 338 the supercritical fluid absorbs energy from the supercritical fluid exiting the turbine 340 thus raising its temperature. After passing through the second recuperator 338, the supercritical fluid may flow through a heater 342, which raises the temperature and pressure of the supercritical fluid. The heater 342 may be a fossil fuel fired heater or a concentrated solar power receiver. The supercritical fluid then enters the turbine 340. As the supercritical fluid flows through the turbine 340, it contacts turbine blades coupled to disks 344 (e.g., rotors) driving rotation of the disks 344. The bladed disks 344 in turn rotate a shaft 346 coupled to a generator 348. The generator 348 then converts the rotation of the shaft 346 into electrical power. As the supercritical fluid flows through the turbine 340 it expands and decreases in pressure and temperature. The supercritical fluid then exits the turbine 340 and flows through the first and second recuperators 336 and 338 exchanging energy with the supercritical fluid exiting the rotary liquid piston compressor 326.

In order to increase the efficiency of the system 320, the supercritical fluid may be split between a first fluid stream that flows through the gas cooler 350 to the rotary liquid piston compressor 326 and a second fluid stream that is directed to a recompressor 352. By controlling the flow of the first and second fluid streams, the system 320 may improve efficiency by ensuring that the temperature of the fluid in the low-temperature recuperator 336 and the temperature of the fluid exiting the rotary liquid piston compressor 326 are within a first threshold temperature difference (e.g., 5%, 10%, 15%, 20% of each other), and that the recombined first and second fluid streams entering the second high-temperature recuperator 338 are within a second threshold temperature (e.g., 5%, 10%, 15%, 20% of each other) of the fluid exiting the turbine 340. Temperatures outside the first and second threshold temperature difference may reduce heat transfer efficiency and thus the efficiency of the system 320.

The system 320 controls the flow of the first fluid stream and the second fluid stream with valves 354, 356, and 358. As illustrated, by controlling the valve 354 the system 320 controls the amount of fluid flowing in the first fluid stream through the gas cooler 350 to the rotary liquid piston compressor 326. Likewise, the valve 356 controls the flow of the second fluid stream to the recompressor 352. In some embodiments, the first stream may include 50-90% of the fluid while the second fluid stream may include 10-49% of the fluid flow. These ratios of the first stream to the second stream may increase the efficiency of the system 320 through heat exchange in the first and second recuperators 336 and 338. The third valve 358 controls the amount of fluid captured from the evaporator chamber 330 that is reinjected into the second fluid loop 324.

In some embodiments, a controller 360 may control the valves 354, 356, and 358 in response to feedback from one or more sensors 362 (e.g., temperature sensors) in order to increase the efficiency of the system 320. The controller 360 may include a processor 364 and a memory 366. For example, the processor 364 may be a microprocessor that executes software to control the operation of the valves 354, 356, and 358 in response to temperatures of the working fluid detected by temperature sensors 362.

Figure 17:
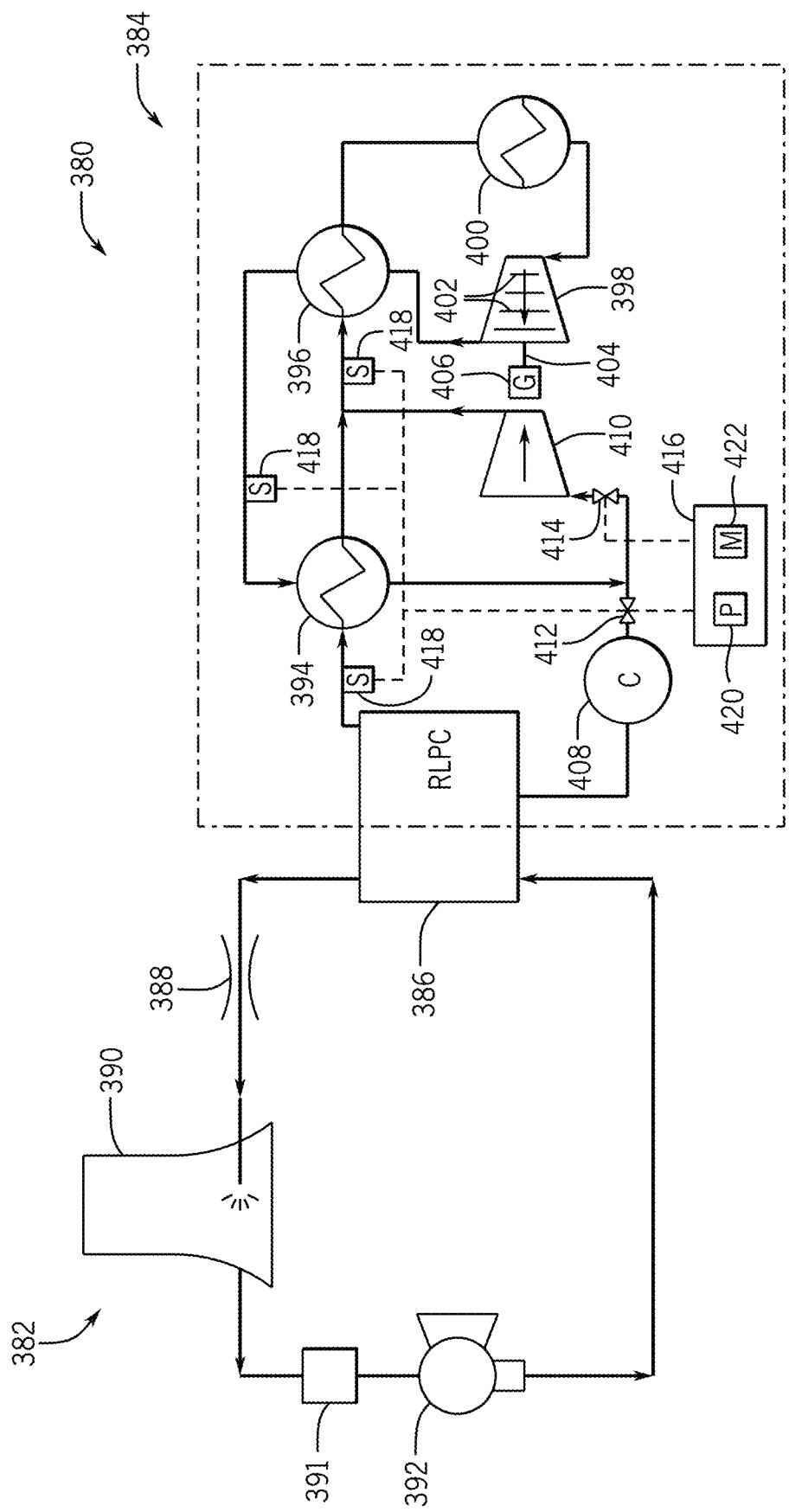
FIG. 17 is a schematic view of an embodiment of a power generation system.

FIG. 17 is a schematic view of an embodiment of a power generation system 380 that uses a supercritical fluid (e.g., supercritical carbon dioxide) to generate power. However, instead of maintaining the fluid in a supercritical state throughout the system 380, the system 380 may enable the process fluid (e.g. supercritical CO2) to change states (e.g. from supercritical to liquid) to provide some thermodynamic efficiency benefits to the cycle. The power generation system 380 therefore uses the RLPC 386 as a rotary liquid piston pump (RLPP). In other words, the RLPC can operate as RLPP in the power generation system 380 where the working fluid is expected to change phases or states from supercritical to a liquid and/or gas. This is in contrast to traditional mechanical centrifugal or axial flow compressors.

As illustrated, the power generation system 380 includes a first fluid loop 382 that circulates a motive fluid that is predominantly liquid (e.g., water) and a second fluid loop 384 that circulates a second fluid that changes states (e.g., supercritical-liquid carbon dioxide). The first fluid loop 382 and the second fluid loop 384 exchange energy with a rotary liquid piston compressor 386 enabling the motive fluid in the first fluid loop 382 to pressurize and pump the second fluid through the second fluid loop 384.

The first fluid loop 382 begins by transferring energy from the motive fluid (e.g., water) to the second fluid in the second fluid loop 384 with the rotary liquid piston compressor 386. After transferring energy, the motive fluid may flow through an orifice or valve (e.g., choke) 388, which reduces the pressure of the motive fluid before entering the cooling tower or other heat exchanger 390. In the cooling tower 390, the motive fluid releases energy absorbed from the second fluid in the rotary liquid piston compressor 386. The ejection of heat from the motive fluid facilitates temperature control of the second fluid as it circulates through the second fluid loop 384. More specifically, removing heat from the motive fluid may block or reduce the ability of the motive fluid to transfer excess thermal energy to the second fluid. After exiting the cooling tower 390, the motive fluid may flow through a filter 391 that removes impurities/debris that may have been created through the interaction of the motive fluid and the second fluid in the rotary liquid piston compressor 386 or through the interaction of process fluid (CO2) with the mechanical components of system 380 (e.g. piping, valves, seals, bearings etc.). After passing through the filter 391, the motive fluid enters the pump 392, which again pressurizes the motive fluid and drives the motive fluid into the rotary liquid piston compressor 386 where the motive fluid again compresses and drives the second fluid through the second fluid loop 384.

After exiting the rotary liquid piston compressor 386, the second fluid may flow through a first recuperator 394 (e.g., lower temperature recuperator) and then through a second recuperator 396 (e.g., high temperature recuperator). In these recuperators 394, 396 the second fluid absorbs energy from the second fluid exiting the turbine 398 thus raising its temperature. After passing through the second recuperator 396, the second fluid may flow through a heater 400, which raises the temperature of the second fluid. The heater 400 may be a fossil fuel fired heater or a concentrated solar power receiver. The supercritical fluid then enters the turbine 398. As the supercritical fluid flows through the turbine 398, it contacts turbine blades coupled to disks 402 (e.g., rotors) driving rotation of the disks 402. The bladed disks 402 in turn rotate a shaft 404 coupled to a generator 406. The generator 406 then converts the rotation of the shaft 404 into electrical power. As the supercritical fluid flows through the turbine 398 it expands and decreases in pressure and temperature. The supercritical fluid then exits the turbine 398 and flows through the first and second recuperators 394 and 396 exchanging heat with the second fluid (e.g., second fluid in a liquid state) exiting the rotary liquid piston compressor 386, thus raising its temperature and converting it into a supercritical state. This heat exchange between the second fluid coming from the turbine 398 and the cooler second fluid exiting the RLPC 386 helps reduce the amount of heat that needs to be added by the heater 400, thus increasing the efficiency of the power generation system 380.

In order to increase the efficiency of the system 380, the supercritical fluid exiting the first recuperator 394 may be split between a first fluid stream that flows through the condenser 408 to the rotary liquid piston compressor 386 and a second fluid stream that is directed to a recompressor 410. By passing the first stream through the condenser 408, the system 380 transitions the second fluid from a supercritical state to a liquid state. Accordingly, the RLPC 386 operates as a pump to pressurize and move the second fluid. By controlling the flow of the first and second fluid streams, the system 380 may improve efficiency by ensuring that the temperature of the fluid exiting the low-temperature recuperator 394 and the temperature of the fluid exiting the recompressor 410 are within a threshold temperature difference (e.g., 1%, 5%, 10%, 15%, 20% of each other). Temperatures outside the threshold temperature difference may reduce the thermodynamic efficiency of the system 380 by increasing entropy losses.

The system controls the flow of the first fluid stream and the second fluid stream with valves 412 and 414. As illustrated, by controlling the valve 412 the system 380 controls the amount of fluid flowing in the first fluid stream through the condenser 408 to the rotary liquid piston compressor 386. Likewise, the valve 414 controls the flow of the second fluid stream to the recompressor 410. In some embodiments, the first stream may include 50-90% of the fluid while the second fluid stream may include 10-49% of the fluid flow. These ratios of the first stream to the second stream increases the efficiency of the system 380 by matching the temperatures of the fluid exiting the first recuperator 394 with that of the fluid exiting the recompressor 410 before they combine and enter the second recuperator 396.

In some embodiments, a controller 416 may control the valves 412 and 414 in response to feedback from one or more sensors 418 (e.g., temperature sensors) in order to increase the efficiency of the system 380. The controller 416 may include a processor 420 and a memory 422. For example, the processor 420 may be a microprocessor that executes software to control the operation of the valves 412 and 414 in response to detected temperatures of the working fluid in the system 440.

Figure 18:
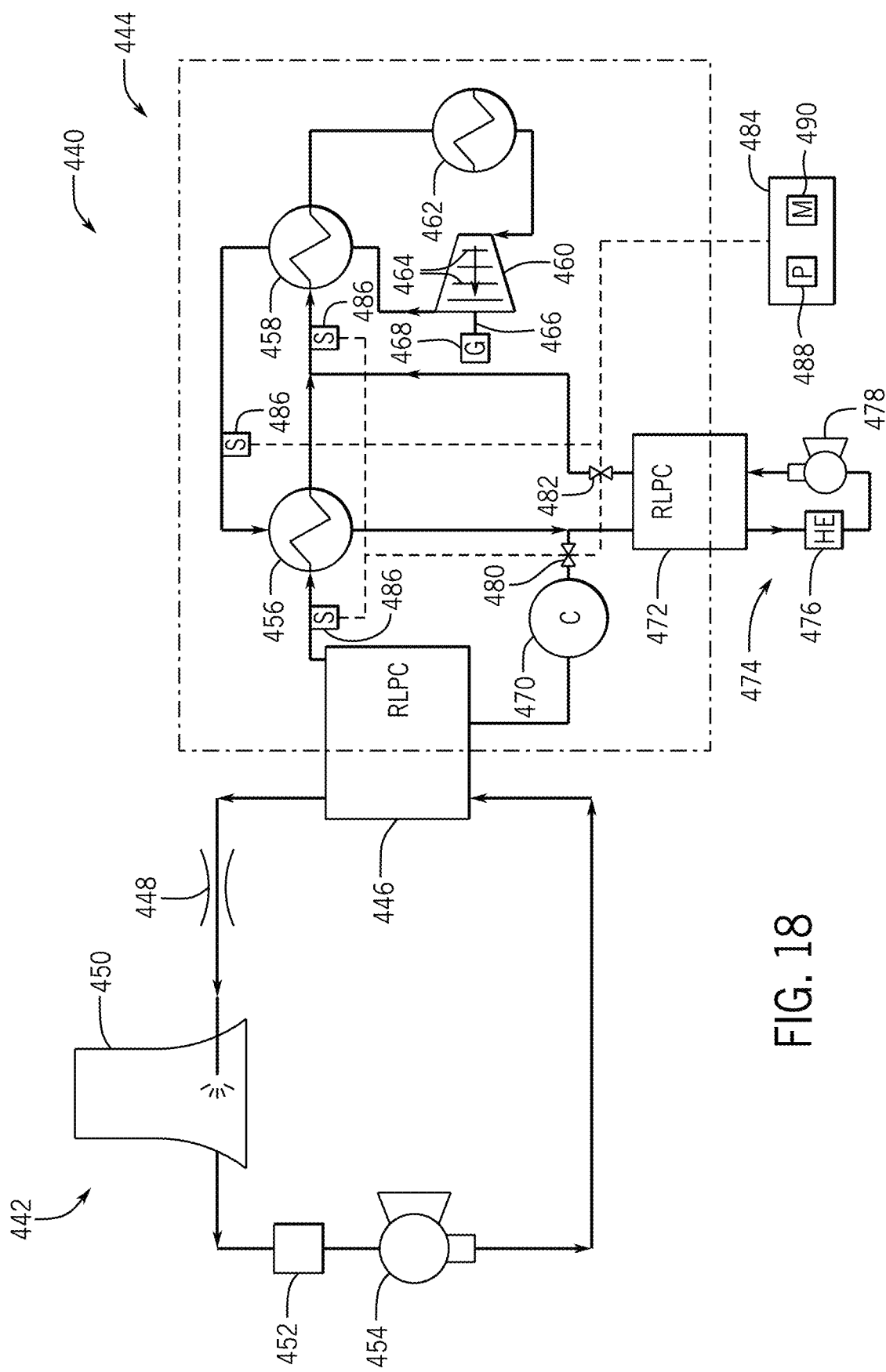
FIG. 18 is a schematic view of an embodiment of a power generation system.

FIG. 18 is a schematic view of an embodiment of a power generation system 440 that uses a supercritical fluid (e.g., supercritical carbon dioxide) to generate power. However, instead of maintaining the fluid in a supercritical state throughout the system 440, the system 440 may enable the system to change between states (e.g., supercritical, liquid).

As illustrated, the power generation system 440 includes a first fluid loop 442 that circulates a first motive fluid that is predominantly liquid (e.g., water) and a second fluid loop 444 that circulates a second fluid that changes states (e.g., supercritical-liquid carbon dioxide). The first fluid loop 442 and the second fluid loop 444 exchange energy with a rotary liquid piston compressor 446 enabling the first motive fluid in the first fluid loop 442 to pressurize and pump the second fluid through the second fluid loop 444.

The first fluid loop 442 begins by transferring energy from the first motive fluid (e.g., water) to the second fluid in the second fluid loop 444 with the rotary liquid piston compressor 446. After transferring energy, the first motive fluid may flow through an orifice or valve (e.g., choke) 448, which reduces the pressure of the first motive fluid before entering the cooling tower 450 or other heat exchanger. In the cooling tower 450, the first motive fluid releases energy absorbed from the second fluid in the rotary liquid piston compressor 446. The ejection of heat from the first motive fluid facilitates temperature control of the second fluid as it circulates through the second fluid loop 444. More specifically, removing heat from the first motive fluid may block or reduce the ability of the first motive fluid to transfer excess thermal energy back to the second fluid. After exiting the cooling tower 450, the first motive fluid may flow through a filter 452 that removes impurities/debris that may have been created through the interaction of the first motive fluid and the second fluid in the rotary liquid piston compressor 446 or through the interaction of process fluid (e.g., CO2) with the mechanical components of system 380 (e.g. piping, valves, seals, bearings etc.). After passing through the filter 452, the first motive fluid enters the pump 454, which again pressurizes the first motive fluid and drives the first motive fluid into the rotary liquid piston compressor 446 where the first motive fluid again compresses and drives the second fluid through the second fluid loop 444.

After exiting the rotary liquid piston compressor 446, the second fluid may flow through a first recuperator 456 (e.g., lower temperature recuperator) and then through a second recuperator 458 (e.g., high temperature recuperator). In these recuperators 456, 458 the second fluid absorbs energy from the second fluid exiting the turbine 460 thus raising its temperature. After passing through the second recuperator 458, the second fluid may flow through a heater 462, which raises the temperature of the second fluid. The heater 462 may be a fossil fuel fired heater, a concentrated solar power receiver, or a waste heat exchanger coupled with the relatively high temperature exhaust of a traditional gas turbine. The supercritical fluid then enters the turbine 460. As the supercritical fluid flows through the turbine 460, it contacts turbine blades coupled to disks 464 (e.g., rotors) driving rotation of the disks 464. The bladed disks 464 in turn rotate a shaft 466 coupled to a generator 468. The generator 468 then converts the rotation of the shaft 466 into electrical power. As the supercritical fluid flows through the turbine 460 it expands and decreases in pressure and temperature. The supercritical fluid then exits the turbine 460 and flows through the first and second recuperators 456 and 458 exchanging heat with the second fluid (e.g., second fluid in a liquid state) exiting the rotary liquid piston compressor 446.

In order to increase the efficiency of the system 440, the supercritical fluid exiting the turbine 460 may be split between a first fluid stream that flows through the condenser 470 to the rotary liquid piston compressor 446 and a second fluid stream that is recompressed. By passing the first stream through the condenser 470, the system 440 transitions the second fluid from a supercritical state to a liquid state. Accordingly, the rotary liquid piston compressor 446 operates as a pump to pressurize and move the second fluid in the second fluid stream. The second fluid stream of the second fluid is not converted into a liquid, but instead remains in a supercritical fluid which is then recompressed. However, instead of recompressing the second fluid stream with a traditional mechanical centrifugal or axial flow recompressor, a rotary liquid piston compressor (RLPC) 472 is used.

The rotary liquid piston compressor 472 enables the second fluid loop 444 to exchange energy with a third fluid loop 474. The rotary liquid piston compressor 472 enables the transfer of energy from a motive fluid (e.g., water) circulating in the third fluid loop 474 with supercritical fluid in the second stream. In this way, the rotary liquid piston compressor 472 is used as a compressor to compress the supercritical fluid in the second fluid loop 444.

The third fluid loop 474 includes a heat exchanger 476, which enables the second motive fluid to release energy absorbed from the second fluid stream in the rotary liquid piston compressor 472. The ejection of heat from the second motive fluid facilitates temperature control of the second fluid stream. More specifically, removing heat from the second motive fluid may block or reduce the ability of the second motive fluid to transfer excess thermal energy back into the second fluid stream. After exiting the heat exchanger 476, the second motive fluid enters the pump 478, which again pressurizes the second motive fluid and drives the second motive fluid into the rotary liquid piston compressor 472 where the second motive fluid again compresses and drives the second fluid stream.

By controlling the flow of the first and second fluid streams, the system 440 may improve efficiency by ensuring that the temperature of the fluid exiting the low-temperature recuperator 456 and the temperature of the fluid exiting the rotary liquid piston compressor 472 are within a threshold temperature difference (e.g., 1%, 5%, 10%, 15%, 20% of each other). Temperatures outside the threshold temperature difference may create entropy losses when the two fluid streams combine at the inlet of the high temperature recuperator 458 and thus reduce the thermodynamic cycle efficiency of the system 440.

The system 440 may control the flow of the first fluid stream and the second fluid stream with valves 480 and 482. As illustrated, by controlling the valve 480 the system 440 controls the amount of fluid flowing in the first fluid stream through the condenser 470 to the rotary liquid piston compressor 386. Likewise, the valve 482 can be used to control the flow or pressure of the second fluid stream coming out of the rotary liquid piston compressor 472. In some embodiments, the first stream may include 50-90% of the fluid while the second fluid stream may include 10-49% of the fluid flow. These ratios of the flow rates of the first stream to the second stream increases the efficiency of the system 440 by reducing the temperature difference of the fluid exiting the first recuperator 456 to that of the fluid exiting the rotary liquid piston compressor 472 before they combine and enter the second recuperator 458.

In some embodiments, a controller 484 may control the valves 480 and 482 in response to feedback from one or more sensors 486 (e.g., temperature sensors) in order to increase the efficiency of the system 440. The controller 484 may include a processor 488 and a memory 490. For example, the processor 488 may be a microprocessor that executes software to control the operation of the valves 480 and 482.

Figure 19:
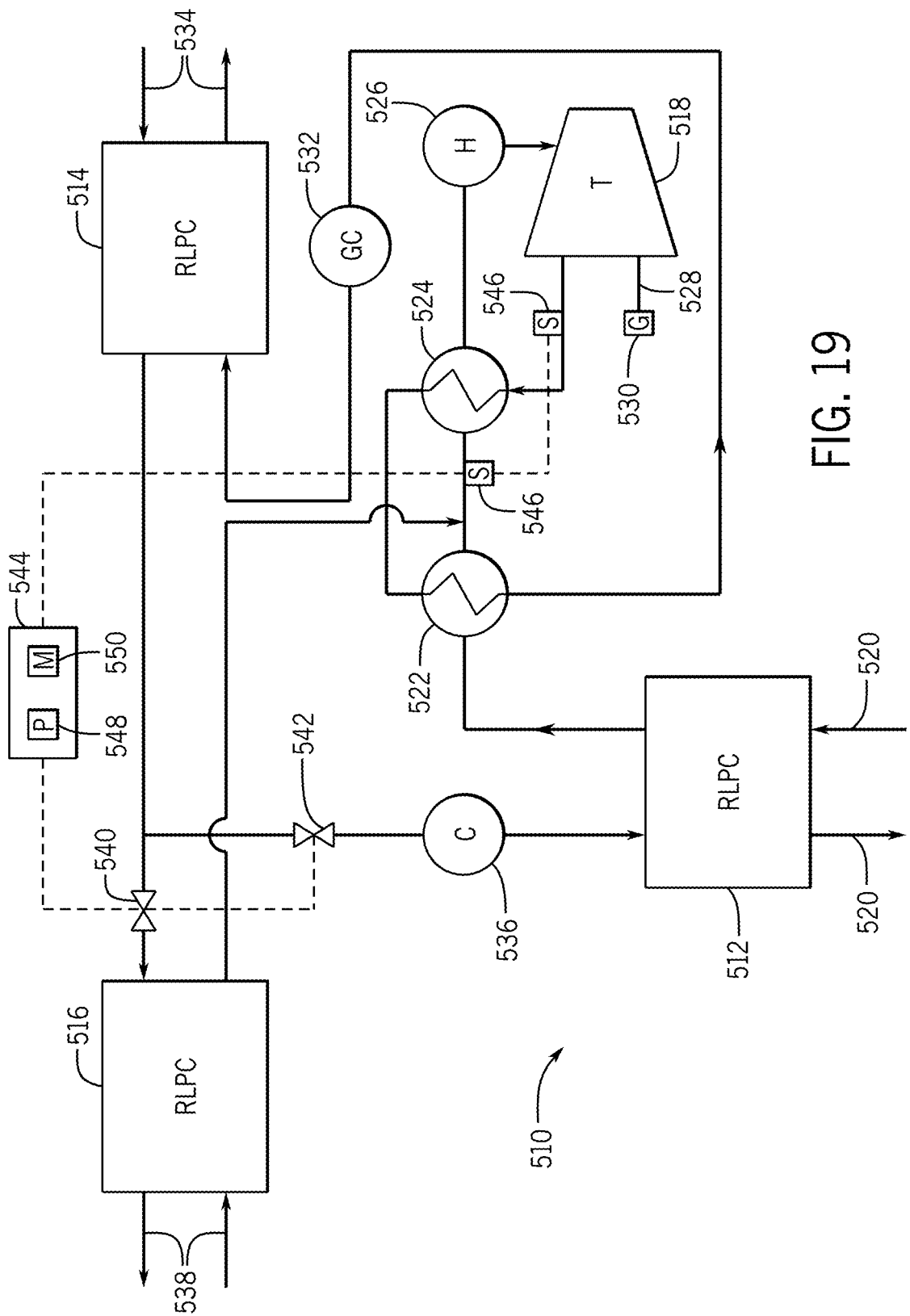
FIG. 19 is a schematic view of an embodiment of a power generation system.

FIG. 19 is a schematic view of an embodiment of a power generation system 510 that uses a working fluid (e.g., carbon dioxide) to generate power. The system 510 includes a rotary liquid piston compressor 512 that acts as a pump for the working fluid and rotary liquid piston compressors 514 and 516 that act as compressors for the working fluid by exchanging pressure with motive fluids. As will be explained below, rotary liquid piston compressor 512 and rotary liquid piston compressors 514 and 516 drive the working fluid in different states (e.g., liquid, supercritical). The power generation system 19 enables the turbine 518 exhaust pressure to be independent of the condenser pressure. This allows fine tuning of the condenser pressure to achieve optimal heat transfer characteristics and thus increased thermodynamic efficiency while the turbine 518 can still take advantage of its optimal pressure ratio.

The rotary liquid piston compressor 512 may operate as a pump to pump the working fluid in a liquid state using a motive fluid 520 (e.g., water). The motive fluid 520 may be pumped to the rotary liquid piston compressor 512 in a fluid loop not shown (e.g., pumped with a positive displacement pump). After exiting the rotary liquid piston compressor 512, the working fluid in the liquid state passes through a first regenerator 522 (e.g., lower temperature regenerator) and then through a second regenerator 524 (e.g., high temperature regenerator) where it receives heat and changes its state to a supercritical state. In these regenerators 522, 524 the working fluid absorbs heat from the working fluid exiting the turbine 518, which raises its temperature. After passing through the second regenerator 524, the working fluid may flow through a heater 526, which raises the temperature of the second fluid to a supercritical state. The heater 526 may be a fossil fuel fired heater or a concentrated solar power receiver, or a waste heat recovery heat exchanger downstream of a traditional gas turbine. The supercritical fluid then enters the turbine 518. As the supercritical working fluid flows through the turbine 518, it contacts turbine blades coupled to rotors driving rotation of the rotors. The rotors in turn rotate a shaft 428 coupled to a generator 530. The generator 530 then converts the rotation of the shaft 528 into electrical power. As the supercritical fluid flows through the turbine 518 it expands and decreases in pressure and temperature. The supercritical working fluid then exits the turbine 518 and flows through the first and second regenerators 522 and 524 exchanging heat with the working fluid exiting the rotary liquid piston compressor 512 and rotary liquid piston compressor 516.

After exiting the turbine 518 and passing through the first and second regenerators 522, 524, the working fluid is directed to the rotary liquid piston compressor 514. Before reaching the rotary liquid piston compressor 514, the working fluid passes through a gas cooler 532. The gas cooler 532 absorbs heat from the working fluid, which increases the density of the working fluid before it enters the rotary liquid piston compressor 514. This increases the efficiency of compression process in the rotary liquid piston compressor 514. The working fluid remains in the supercritical state during its entire stay from inlet to exit of the rotary liquid piston compressor 514. The rotary liquid piston compressor 514 compresses the working fluid using a motive fluid 534. After compression, a fraction of the working fluid goes to the rotary liquid piston compressor 516 and remaining goes to the rotary liquid piston compressor 512. That is, the working fluid is split into a first fluid stream that enters the rotary liquid piston compressor 512 and a second fluid stream that enters the rotary liquid piston compressor 516.

As the first fluid stream travels to the rotary liquid piston compressor 512, the first stream of fluid passes through a condenser 536. The condenser 536 removes heat from the first fluid stream enabling the first fluid stream to turn into a liquid. The first fluid stream is then pumped by the rotary liquid piston compressor to the turbine 518 through the two regenerators 522 and 524 and the heater 526. While the first stream condenses, the rotary liquid piston compressor 516 receives the second stream of fluid and compresses the second fluid stream using a motive fluid 538. After exiting the rotary liquid piston compressor 516, the second fluid stream recombines with the first fluid stream before the first fluid stream reaches the second regenerator 524. By controlling the flow of the first and second fluid streams, the system 510 reduces entropy losses and improves the cycle efficiency by ensuring that the temperature of the first fluid stream is within a threshold temperature difference (e.g., 1%, 5%, 10%, 15%, 20%) of that of the second fluid stream before they recombine and enter the second regenerator 524.

The system 510 controls the flow of the first fluid stream and the second fluid stream with valves 540 and 542. By controlling the valve 542 the system 510 controls the amount of fluid flowing in the first fluid stream to the rotary liquid piston compressor 512. Likewise, the valve 540 controls the flow of the second fluid stream to the rotary liquid piston compressor 516. In some embodiments, the first stream may include 50-90% of the fluid while the second fluid stream may include 10-49% of the fluid flow. The ratio of the first stream to the second stream increases the efficiency of the system 510.

In some embodiments, a controller 544 may control the valves 540 and 542 in response to feedback from one or more sensors 546 (e.g., temperature sensors) in order to increase the efficiency of the system 510. The controller 544 may include a processor 548 and a memory 550. For example, the processor 548 may be a microprocessor that executes software to control the operation of the valves 540 and 542.

Figure 20:
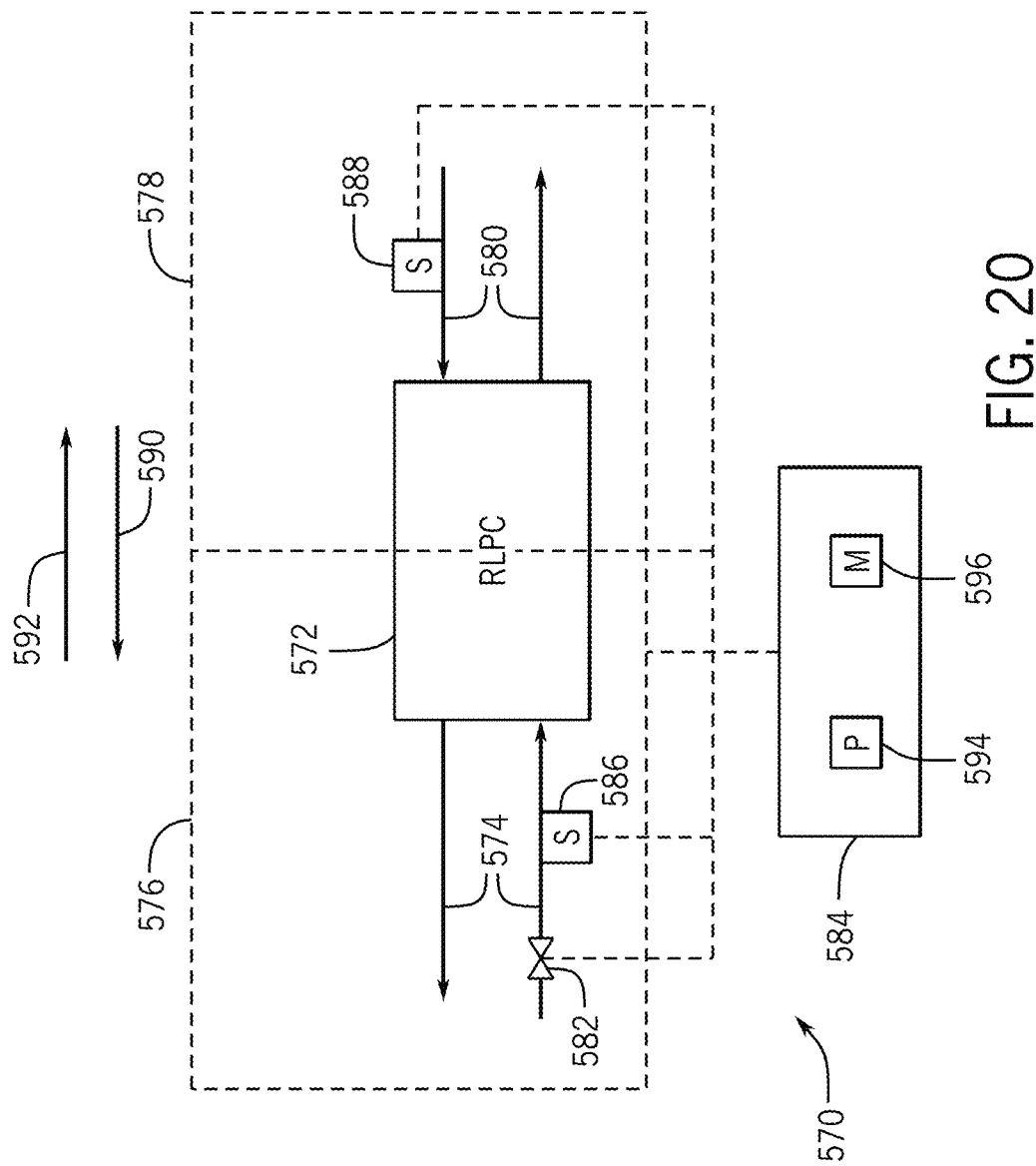
FIG. 20 is a schematic view of an embodiment of a control system that controls the movement of a motive fluid and a working fluid in an RLPC.

FIG. 20 is a schematic view of an embodiment of a control system 570 that controls the movement of a motive fluid and a working fluid (e.g., supercritical fluid) in a rotary liquid piston compressor 572. As explained above in FIGS. 2 and 16-19, a rotary liquid piston compressor may be used to exchange energy between two fluids. For example, the rotary liquid piston compressor 572 may be used to exchange energy between two fluids in the power generation systems described above. In order to reduce and or block the transfer of the motive fluid 574 (e.g., water) circulating in a motive fluid loop 576 from entering a working fluid loop 578 circulating a working fluid 580 (e.g., supercritical CO2), the control system 570 may control the flow rate of the motive fluid 574 into the rotary liquid piston compressor 572 in response to a flow rate of the working fluid 580. That is, by controlling the flow rate of the motive fluid 574, the control system 570 can block and/or limit motive fluid 574 from flowing completely through the rotary liquid piston compressor 572 (i.e., flow completely through the channels 70 seen in FIG. 3) and into the working fluid loop 578.

In order to control the flow rate of the motive fluid 574, the control system 570 includes a valve 582, which controls the amount of the motive fluid 574 entering the rotary liquid piston compressor 572. The sensors 586 and 588 sense the respective flowrates of the motive and working fluids 574, 580 and emit signals indicative of the flowrates. That is, the sensors 586 and 588 measure the respective flowrates of the motive fluid 574 and working fluid 580 into the rotary liquid piston compressor 572. The controller 584 receives and processes the signals from the sensors 586, 588 to detect the flowrates of the motive and working fluids 574, 580.

In response to the detected flowrates, the controller 584 controls the valve 582 to block and/or reduce the transfer of the motive fluid 574 into the working fluid loop 578. For example, if the controller 584 detects a low flowrate with the sensor 588, the controller 584 is able to associate the flowrate with how far the working fluid entered the rotary liquid piston compressor 572 in direction 590. The controller 584 is therefore able to determine an associated flowrate of the motive fluid 574 into the rotary liquid piston compressor 572 that drives the working fluid 580 out of the rotary liquid piston compressor 572 in direction 592 without driving the motive fluid 574 out of the rotary liquid piston compressor 572 in the direction 592. In other words, the controller 584 controls the valve 582 to ensure that the flowrate of the working fluid 580 into the rotary liquid piston compressor 572 is greater than the flowrate of the motive fluid 574 to block the flow of motive fluid 574 into the working fluid loop 578.

As illustrated, the controller 584 may include a processor 594 and a memory 596. For example, the processor 594 may be a microprocessor that executes software to process the signals from the sensors 586, 588 and in response control the operation of the valve 582.

Figure 21:
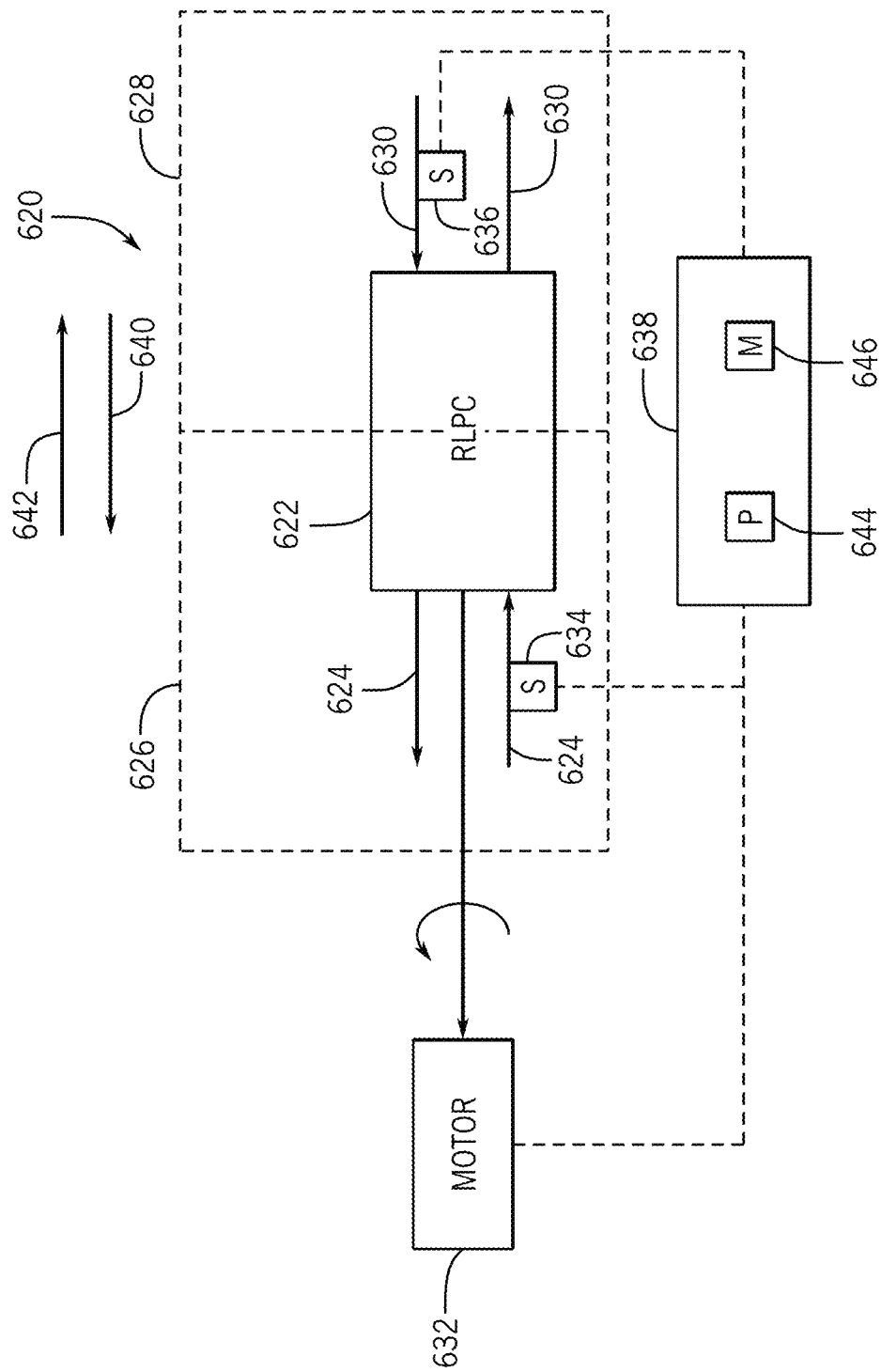
FIG. 21 is a schematic view of an embodiment of a control system that controls the movement of a motive fluid and a working fluid in an RLPC.

FIG. 21 is a schematic view of an embodiment of a control system 620 that controls the movement of a motive fluid and a working fluid (e.g., supercritical fluid) in a rotary liquid piston compressor 622. As explained above in FIGS. 2 and 16-19, a rotary liquid piston compressor or pump may be used to exchange energy between two fluids. For example, the rotary liquid piston compressor 622 may be used to exchange energy between two fluids in the power generation systems described above. In order to reduce and or block the transfer of the motive fluid 624 (e.g., water) circulating in a motive fluid loop 626 from entering a working fluid loop 628 circulating a working fluid 630 (e.g., supercritical CO2), the control system 620 may control the distance the motive fluid travels axially within a rotor channel of the rotary liquid piston compressor 622 in response to the flow rate of the working fluid 630 and the flow rate of the motive fluid 624. The control system 620 controls the movement of the motive fluid by slowing down or speeding up the rotational speed of the rotor of the rotary liquid piston compressor 622. That is, by controlling the rotational speed, the control system 620 can block and/or limit the motive fluid 624 from flowing completely through the rotary liquid piston compressor 622 (i.e., flow completely through the channels 70 seen in FIG. 3) and into the working fluid loop 628.

In order to reduce the mixing of motive fluid 624 with the working fluid 630, the control system 620 includes a motor 632. The motor 632 controls the rotational speed of the rotor (e.g., rotor 46 seen in FIG. 3) and therefore to what axial length the motive fluid 624 can flow into the channels of the rotor. The faster the rotor spins the less time the motive fluid and working fluid have to flow into the channels of the rotor and thus motive fluid/process fluid occupies a smaller axial length of the rotor channel. Likewise, the slower the rotor spins the more time the motive fluid and the working fluid have to flow into the channels of the rotor and thus motive fluid/process fluid occupies a larger axial length of the rotor channel.

The control system 620 may include a variable frequency drive for controlling the motor and sensors 634 and 636 that sense the respective flowrates of the motive and working fluids 624, 630 and emit signals indicative of the flowrates. The controller 638 receives and processes the signals to detect the flowrates of the motive and working fluids 624, 630. In response to the detected flowrates, the controller 638 sends a command to the variable frequency drive that controls the speed of the motor 632 to block and/or reduce the transfer of the motive fluid 624 into the working fluid loop 578. For example, if the controller 638 detects a low flowrate of the working fluid 630 with the sensor 636, the controller 638 is able to associate the flowrate with how far the working fluid has moved into the channels of the rotary liquid piston compressor 622 in direction 640. The controller 638 is therefore able to determine an associated speed of the motor 632 that drives the working fluid 630 out of the rotary liquid piston compressor 622 in direction 642 without driving the motive fluid 624 out of the rotary liquid piston compressor 622 in the direction 642.

In response to a low instantaneous flowrate of the working fluid with respect to motive fluid, the controller 638 controls the motor 632 through a variable frequency drive to increase the rotational speed of the rotary liquid piston compressor 622 (i.e., increase the rotations per minute) to reduce the axial length that the motive fluid 624 can travel within the channels of the rotary liquid piston compressor 622. Likewise, if the instantaneous flowrate of the working fluid 630 is too high with respect to the motive fluid, the controller 638 reduces the rotational speed of the rotary liquid piston compressor 622 to increase the axial distance traveled by the motive fluid 624 into the channels of the rotary liquid piston compressor 622 to drive the working fluid 630 out of the rotary liquid piston compressor 622.

As illustrated, the controller 638 may include a processor 644 and a memory 646. For example, the processor 644 may be a microprocessor that executes software to process the signals from the sensors 634, 636 and in response control the operation of the motor 632.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
   a rotary liquid piston compressor configured to exchange pressure between a liquid and a supercritical fluid, wherein the rotary liquid piston compressor comprises:
   a rotor configured to exchange pressure between the liquid and the supercritical fluid as the rotor rotates, the rotor defining a plurality of channels that extend through the rotor; and
   a plurality of barriers configured to block mixing between the liquid and the supercritical fluid, wherein the plurality of barriers rest within the rotor, and wherein each channel of the plurality of channels is configured to receive a barrier of the plurality of barriers.

2. The system of claim 1, wherein the plurality of barriers comprises a plane diaphragm.

3. The system of claim 1, wherein the plurality of barriers comprises a foldable diaphragm.

4. The system of claim 3 comprising a spring coupled to the foldable diaphragm.

5. The system of claim 1 comprising a plate, wherein the plurality of barriers are coupled to the plate, and wherein the plate is configured to couple to the rotor to couple the plurality of barriers to the rotor.

6. The system of claim 5, wherein the rotor comprises a first rotor section and a second rotor section, and wherein the plate is configured to couple to the rotor between the first rotor section and the second rotor section.

7. The system of claim 6, wherein the first rotor section forms first openings, the second rotor section forms second openings, and the plate forms third openings, wherein a plurality of fasteners removably attach the first rotor section, the second rotor section, and the plate via the first openings, the second openings, and the third openings.

8. A system comprising:
   a rotary liquid piston compressor configured to exchange pressure between a liquid and a supercritical fluid, wherein the rotary liquid piston compressor comprises a rotor configured to exchange pressure between the liquid and the supercritical fluid as the rotor rotates, the rotor defining a plurality of channels that extend through the rotor; and a thermal management system surrounding at least a portion of the rotor, wherein the thermal management system is configured to exchange heat with the rotary liquid piston compressor.

9. The system of claim 8, wherein the thermal management system comprises a plurality of conduits that wrap around housing of the rotary liquid piston compressor.

10. The system of claim 9, wherein each conduit of the plurality of conduits has a diameter between about 0.05 mm and 0.5 mm.

11. The system of claim 8, wherein the thermal management system comprises a cooling system configured to circulate a cooling fluid to remove heat from the rotary liquid piston compressor.

12. The system of claim 11, wherein the cooling system is configured to prevent phase change of the supercritical fluid to gas.

13. The system of claim 9, wherein the thermal management system comprises a heating system configured to circulate a heating fluid to heat the rotary liquid piston compressor.

14. The system of claim 9, wherein the thermal management system comprises an electric coil configured to heat the rotary liquid piston compressor.

15. A system comprising:
    a rotary liquid piston compressor configured to exchange pressure between a first fluid and a second fluid, wherein the rotary liquid piston compressor comprises:
    a rotor configured to exchange pressure between the first fluid and the second fluid as the rotor rotates, the rotor defining a plurality of channels that extend through the rotor; and
    a plurality of foldable diaphragms configured to block mixing between the first fluid and the second fluid, wherein the plurality of foldable diaphragms rest within the rotor, and wherein each channel of the plurality of channels is configured to receive a respective foldable diaphragm of the plurality of foldable diaphragms.

16. The system of claim 15, wherein a first foldable diaphragm of the plurality of foldable diaphragms is configured to expand within a first channel of the plurality of channels as the first fluid flows into the first foldable diaphragm to drive a portion of the second fluid out of the first channel to pressurize the second fluid.

17. The system of claim 15, wherein a second foldable diaphragm of the plurality of foldable diaphragms is configured to compress within a second channel of the plurality of channels as a portion of the second fluid enters the second channel prior to the portion of the second fluid being pressurized by the first fluid.

18. The system of claim 15, wherein:
    the first fluid is a liquid and the second fluid is a supercritical fluid; or
    the first fluid is the supercritical fluid and the second fluid is the liquid.

19. The system of claim 15, wherein the rotor is configured to rotate about a central axis of the rotary liquid piston compressor.

20. The system of claim 15 further a plate coupled to the plurality of foldable diaphragms, wherein the plate is disposed between a first portion of the rotor and a second portion of the rotor.

\* \* \* \* \*